US008155667B2

(12) United States Patent
Jang et al.

(10) Patent No.: US 8,155,667 B2
(45) Date of Patent: Apr. 10, 2012

(54) MOBILE TERMINAL AND METHOD OF TRANSFERRING OR RECEIVING DATA USING THE SAME

(75) Inventors: Min Kyoung Jang, Seoul (KR); Yong Sin Kim, Seoul (KR); Hye Yeon Park, Seoul (KR); Jin Ho Son, Seoul (KR); Doo Yi Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 398 days.

(21) Appl. No.: 12/539,220

(22) Filed: Aug. 11, 2009

(65) Prior Publication Data

US 2010/0151880 A1    Jun. 17, 2010

(30) Foreign Application Priority Data

Dec. 16, 2008  (KR) ......................... 10-2008-0127617
Dec. 16, 2008  (KR) ......................... 10-2008-0127618
Dec. 17, 2008  (KR) ......................... 10-2008-0128717
Jul. 7, 2009   (KR) ......................... 10-2009-0061707

(51) Int. Cl.
*H04W 74/00* (2009.01)
(52) U.S. Cl. ................................................. 455/456.1
(58) Field of Classification Search .... 455/456.1–456.6, 455/466, 566, 422.1, 575.1, 404.1, 432.1, 455/433, 434, 457, 411.1
See application file for complete search history.

(56) References Cited

U.S. PATENT DOCUMENTS

| | | | | |
|---|---|---|---|---|
| 6,853,911 B1* | 2/2005 | Sakarya | ......................... | 701/455 |
| 6,871,076 B2* | 3/2005 | Samn | ......................... | 455/456.1 |
| 7,466,987 B2* | 12/2008 | Kinnunen et al. | ......... | 455/456.3 |
| 7,548,954 B2* | 6/2009 | Brown et al. | .................. | 709/206 |
| 7,630,724 B2* | 12/2009 | Beyer et al. | .................. | 455/457 |
| 7,756,939 B2* | 7/2010 | Brown et al. | .................. | 709/206 |
| 7,783,710 B2* | 8/2010 | Ramaswamy | ................ | 709/206 |
| 7,907,931 B2* | 3/2011 | Hartigan et al. | ............ | 455/404.2 |
| 8,064,887 B2* | 11/2011 | Logan | ............................ | 455/413 |
| 2004/0192329 A1* | 9/2004 | Barbosa et al. | ............. | 455/456.1 |
| 2004/0192332 A1* | 9/2004 | Samn | ......................... | 455/456.1 |
| 2008/0032703 A1* | 2/2008 | Krumm et al. | .............. | 455/456.1 |
| 2008/0306682 A1* | 12/2008 | Dorfstatter et al. | ........... | 701/207 |

FOREIGN PATENT DOCUMENTS

| | | |
|---|---|---|
| EP | 173991 A1 | 1/2007 |
| KR | 10-2006-0016357 A | 2/2006 |
| KR | 10-2006-0104393 A | 10/2006 |
| KR | 10-2006-0120969 A | 11/2006 |
| KR | 10-0680294 B1 | 2/2007 |

* cited by examiner

*Primary Examiner* — Melody Mehrpour
(74) *Attorney, Agent, or Firm* — Birch, Stewart, Kolasch & Birch, LLP

(57) ABSTRACT

The present invention relates to a mobile terminal which transfers or receives data, including location information, in various ways, and a method of transferring or receiving data using the same.

23 Claims, 28 Drawing Sheets

FIG. 9

```
BEGIN:VCARD
VERSION:2.1
N:Gump;Forrest
FN:Forrest Gump
ORG:Bubba Gump Shrimp Co.
TITLE:Shrimp Man
TEL;WORK;VOICE:(111) 555-1212
TEL;HOME;VOICE:(404) 555-1212
ADR;WORK:;;100 Waters Edge;Baytown;LA;30314;United States of America
LABEL;WORK;ENCODING=QUOTED-PRINTABLE:100 Waters Edge=0D=0ABaytown, LA 30314=0D=0AUnited States of America
ADR;HOME:;;42 Plantation St.;Baytown;LA;30314;United States of America
LABEL;HOME;ENCODING=QUOTED-PRINTABLE:42 Plantation St.=0D=0ABaytown, LA 30314=0D=0AUnited States of America
EMAIL;PREF;INTERNET:forrestgump@walladalla.com
REV:20080424T195243Z
END:VCARD
```

MOBILE TERMINAL AND METHOD OF TRANSFERRING OR RECEIVING DATA USING THE SAME

This application claims priority under 35 U.S.C. §119(a) on Korean Patent Application No. 10-2008-0127617 filed in Republic of Korea on Dec. 16, 2008, No. 10-2008-0127618 filed in Republic of Korea on Dec. 16, 2008, No. 10-2008-0128717 filed in Republic of Korea on Dec. 17, 2008 and No. 10-2009-0061707 filed in Republic of Korea on Jul. 7, 2009, the entire contents of all which are hereby incorporated by reference.

BACKGROUND OF THE INVENTION

1. Field of the Invention

The present invention relates to a mobile terminal and, more particularly, to a mobile terminal which transfers or receives data, including location information, in various ways, and a method of transferring or receiving data using the same.

2. Discussion of the Related Art

As the functionality of terminals, such as personal computers, notebook computers, and mobile phones, is diversified, the terminals are being implemented in the form of multimedia players equipped with complex functions, such as capturing images and video, playing music or video files, game, and reception of broadcast.

Terminals can be divided into mobile terminals and stationary terminals according to whether they are movable. Mobile terminals can also be divided into handheld terminals and vehicle mount terminals according to whether they can be directly carried on by a user.

In order to support and increase the functionality of the terminals, the improvement of structural or software portions or both of the terminals may be taken into consideration.

In recent years, a variety of terminals, including mobile terminals, provide complex and various functionalities, but do not provide various functions related to location information.

SUMMARY OF THE INVENTION

An aspect of the present invention is to provide a mobile terminal, which is capable of transferring or receiving data, including location information, in various ways and using them in various ways, and a method of transferring or receiving data using the same.

Another aspect of the present invention is to provide a terminal and method for providing and managing location information, which address the limitations and disadvantages associated with the related art.

According to a first aspect of the present invention, there is provided a mobile terminal, including a communication unit, an input unit, a location information unit managing at least one location information, and a controller receiving a message and a receiver through the input unit, selecting location information to be transferred with the message by controlling the location information unit, and transferring the message and a file including the selected location information as a file manageable separately from the message to the receiver through the communication unit.

According to a second aspect of the present invention, there is provided a mobile terminal, including a communication unit, an input unit, a location information unit for obtaining location information, and a controller receiving a message and a receiver through the input unit, obtaining location information about a current location by controlling the location information unit, and transferring the location information together with the message selectively to the receiver according to the receiver through the communication unit.

According to a third aspect of the present invention, there is provided a mobile terminal, including a communication unit, an input unit, a location information unit for obtaining location information, and a controller receiving a message and a receiver through the input unit, obtaining location information about a current location by controlling the location information unit, changing a representation format of the obtained location information to reduce data size of the obtained location information according to a predefined method, and transferring the message and the changed location information to the receiver through the communication unit.

According to a fourth aspect of the present invention, there is provided a mobile terminal, including a communication unit, memory storing at least one application, and a controller, if a message and location information are received through the communication unit, storing the location information in the memory automatically or according to a first command of a user.

According to a fifth aspect of the present invention, there is provided a method for transferring data of a mobile terminal, including receiving a message and a receiver, selecting location information, and transferring a file including the selected location information to the receiver, the file being manageable separately from the message.

According to a sixth aspect of the present invention, there is provided a method for transferring data of a mobile terminal, including receiving a message and a receiver, and transferring the message to the receiver but selectively transferring location information about a current location of the mobile terminal together with the message according to the receiver.

According to a seventh aspect of the present invention, there is provided a method for transferring data of a mobile terminal, including receiving a message and a receiver, obtaining location information about a current location of the mobile terminal, changing a representation format of the obtained location information to reduce data size of the obtained location information according to a predefined method, and transferring the message and the changed location information to the receiver.

According to an eighth aspect of the present invention, there is provided a method for receiving data of a mobile terminal, including receiving a message and location information, and storing the location information automatically or according to a first command of a user.

According to a ninth aspect of the present invention, there is provided a mobile terminal, including memory storing at least one data including location information, a local area communication module for communicating with an external electronic device by using short range communication, and an external first electronic device located within communication range of the short range communication being selected, a controller transferring a first data including location information rather than a current location of a mobile terminal from among the at least one data through the selected first electronic device through the local area communication module.

According to a tenth aspect of the present invention, there is provided a method for transferring data of a mobile terminal, including selecting an external electronic device located within communication range of short range communication, and transferring data including location information rather than a current location of the mobile terminal to the selected electronic device by using the short range communication.

According to an eleventh aspect of the present invention, there is provided a method for transferring data of a mobile terminal, including receiving data including location information rather than a current location of the mobile terminal from an external first electronic device, selecting an external second electronic device within communication range of short range communication, and transferring the received data or the location information to the second electronic device through short range communication.

According to another aspect of the present invention, there is provided a mobile terminal for processing a message, comprising: a communication unit; a location information unit configured to manage at least one location information; and a controller configured to obtain location information selected among the at least one location information and to transfer together a first file including the message and a second file including the selected location information through the communication unit, the first file being different from the second file.

According to another aspect of the present invention, there is provided a mobile terminal comprising: a communication unit; a location information unit configured to obtain current location information associated with the mobile terminal; and a controller configured to obtain a receiver's information for a message, to determine whether or not to transfer the current location information based on the receiver's information, and to selectively transfer the current location information together with the message through the communication unit based on the determination result.

According to another aspect of the present invention, there is provided a mobile terminal for processing a message, the mobile terminal comprising: a communication unit; a location information unit configured to obtaining current location information associated with the mobile terminal, the obtained current location information having a first data size; and a controller configured to reduce the first data size of the obtained current location information to have a second data size, and to transfer the message and the current location information having the second data size through the communication unit.

According to another aspect of the present invention, there is provided a mobile terminal comprising: a communication unit configured to receive at least one of a message and at least one location information; a location information storage unit; and a controller configured to automatically store the location information received from the communication unit into the location information storage unit for organizing the location information, if the communication unit receives the message with the location information.

According to another aspect of the present invention, there is provided a mobile terminal comprising: a local area communication module configured to communicate with an external electronic device by using a local area communication; and a controller configured to transfer location information excluding current location information of the mobile terminal, to the external electronic device through the local area communication, wherein the location information is particular location information selected among a plurality of different location information, and/or the external electronic device is an external electronic device selected among a plurality of different external electronic devices.

According to another aspect of the present invention, there is provided a mobile terminal comprising: a radio communication unit; a location information unit configured to obtain current location information of the mobile terminal; a storage unit configured to store other location information; and a controller configured to transfer location information selected among the current location information and the other location information to at least one external device through the radio communication unit.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 illustrates an example of V-Card file according to the present invention;

DETAILED DESCRIPTION

Reference will now be made in detail to the preferred embodiments of the present invention, examples of which are illustrated in the accompanying drawings.

Figure 1:
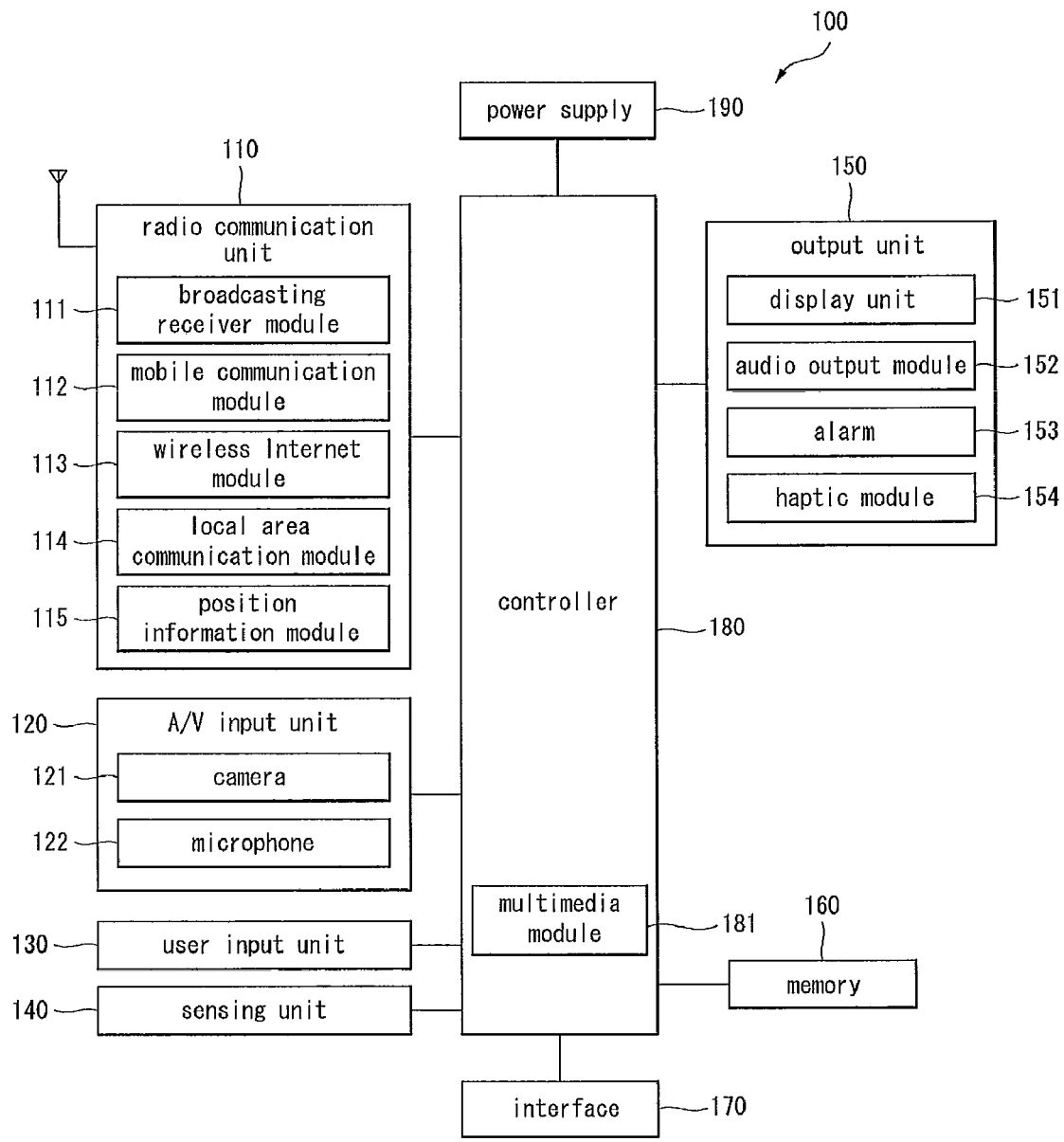
FIG. 1 illustrates a block diagram of a mobile terminal related to one embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190. All components of the mobile terminal 100 are operatively coupled and configured.

In addition, the radio communication unit 110 includes at least one module that enables radio communication between the mobile terminal 100 and a radio communication system or between the mobile terminal 100 and a network in which the mobile terminal 100 is located. For example, the radio communication unit 110 includes a broadcasting receiving module (or broadcast receiver module) 111, a mobile communication module 112, a wireless Internet module 113, a local area communication module 114 and a position information module 115.

The broadcasting receiving module 111 receives broadcasting signals and/or broadcasting related information from an external broadcasting management server or other suitable device through a broadcasting channel. Also, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal.

Further, the broadcasting signals can include not only TV broadcasting signals, radio broadcasting signals and data broadcasting signals, but also signals in the form of combination of a TV broadcasting signal and a radio broadcasting signal. In addition, the broadcasting related information can be information on a broadcasting channel, a broadcasting program or a broadcasting service provider, and can be provided even through a mobile communication network. In the latter case, the broadcasting related information can be received by the mobile communication module 112.

Also, the broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. Particularly, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) systems, etc. The broadcasting receiving module 111 can also be constructed to be suited to broadcasting systems providing broadcasting signals other than the above-described digital broadcasting systems.

Further, the broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

In addition, the wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique.

Also, the local area communication module 114 corresponds to a module for local area communication. The local area communication includes a short range communication. For example, Bluetooth, radio frequency identification (RFID), infrared data association (IrDA), ultra wideband (UWB) and ZigBee can be used as a local area communication technique, which can be performed by the local area communication module 114.

The position information module 115 is used for identifying and/or obtaining the location of a mobile device. The position information module 115 can obtain location information through Global Navigation Satellite System (GNSS), cell identification (cell-ID), or wireless LAN-based location sensing. In what follows, each method by which the position information module 115 acquires location information is described.

First, the position information module 115 can acquire location information through GNSS. GNSS is a generic term for satellite navigation systems that provide reference signals by which particular types of radio navigation receivers can determine their positions on or near the earth's surface. The GNSS comprises the U.S. system GPS (Global Positioning System), the European system Galileo, the Russian system GLONASS (Global Orbiting Navigational Satellite System), the Chinese system COMPASS, and the Japanese system QZSS (Quasi-Zenith Satellite System).

In a typical example of GNSS, the position information module 115 can be a GPS module. The GPS module measures distances between a particular position and more than three satellites, extracts information about the time at which the distances are measured, and applies triangulation to the measured distances, thereby obtaining three dimensional location information expressed by latitude, longitude, and altitude. Another popular GPS triangulation method utilizes three satellites to obtain position and time information and incorporates signals from a fourth satellite to compensate for error of the position and time information. The GPS module continuously calculates current position in real time and estimates velocity information based on the calculated position.

Second, the position information module 115 can acquire location information through cell identification (cell ID) location technique. The cell ID location technique employs several radio base stations 200 of a wireless communications system (for example, refer to FIG. 5A). The wireless communications system refers to a mobile communications system based on CDMA, GSM, or WCDMA. In the cell ID location technique, position tracking is based on ID information (for example, base station ID) of more than one base station 200 that covers the current location of the mobile terminal 100 and signal strength information received from each base station. The cell ID location technique may incorporate one or two base stations or triangulation based on three base stations for more accurate localization. In other words, according to the number of base stations available, a different localization algorithm can be applied for the cell ID location technique, achieving higher accuracy as the number of base stations increases.

Third, the position information module 115 can acquire location information through a wireless LAN based location sensing technique. FIG. 5B illustrates an example of a wireless LAN system that communicates with the mobile terminal illustrated in FIG. 1. A wireless LAN system generally incorporates a number of access points (APs) corresponding to the terminal points of a backbone network. The wireless LAN system can recognize the information about the position of each access point. Also, the location information of each access point can be managed either by particular areas or by the respective access points. The mobile terminal 100 can carry out wireless communication with the access point through wireless LAN access. Therefore, the mobile terminal 100, through wireless communication with the access point, can acquire the information about the current location of the mobile terminal 100.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display unit 151.

Also, the image frames processed by the camera 121 can be stored in the memory (or storage unit) 160 or transmitted to an external device through the radio communication unit 110. The mobile terminal 100 can also include at least two cameras. The microphone 122 receives an external audio signal in a call mode, a recording mode or a speed recognition mode and processes the received audio signal into electric audio data.

The audio data can then be converted into a form that can be transmitted to a mobile communication base station through the mobile communication module 112 and output in the call mode. Further, the microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on. The user may also input commands and data via voice through the user input unit 130.

Also, the sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100.

For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can also include a proximity sensor.

In addition, the output unit 150 generates visual, auditory or tactile output and can include the display unit 151, an audio output module 152, an alarm 153 and a haptic module 154. Further, the display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

In addition, the display unit 151 can include at least one of a liquid crystal display, a thin film transistor liquid crystal display, an organic light-emitting diode display, a flexible display and a three-dimensional display. Further, some of these displays can be of a transparent type or a light transmission type. That is, the display unit 151 can include a transparent display.

In more detail, the transparent display includes a transparent liquid crystal display. Further, the rear structure of the display unit 151 can also be of the light transmission type. Accordingly, a user can see an object located behind the body of the mobile terminal 100 through the transparent area of the body of the mobile terminal 100, which is occupied by the display unit 151.

The mobile terminal 100 can also include at least two display units 151. For example, the mobile terminal 100 can include a plurality of displays that are arranged on a single face at a predetermined distance or integrated displays. The plurality of displays can also be arranged on different sides.

In addition, when the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

Further, the touch sensor can be constructed to convert a variation in pressure applied to a specific portion of the display unit 151 or a variation in capacitance generated at a specific portion of the display unit 151 into an electric input signal. The touch sensor can also be constructed to sense pressure of touch as well as the position and area of the touch.

Also, when the user applies a touch input to the touch sensor, a signal corresponding to the touch input is transmitted to a touch controller, which may be part of the controller 180 or the output unit 150. The touch controller then processes the signal and transmits data corresponding to the processed signal to the controller 180. Accordingly, the controller 180 can detect a touched portion of the display unit 151.

Referring to FIG. 1, the proximity sensor of the sensing unit 140 can be located in an internal region of the mobile terminal, surrounded by the touch screen, or near the touch screen. The proximity sensor senses an object approaching a predetermined sensing face or an object located near the proximity sensor using an electromagnetic force or infrared rays without having mechanical contact. Further, the proximity sensor has lifetime longer than that of a contact sensor and thus has a wide application in the mobile terminal 100.

In addition, the proximity sensor can include a transmission type photo-electric sensor, a direct reflection type photoelectric sensor, a mirror reflection type photo-electric sensor, a high-frequency oscillating proximity sensor, a capacitive proximity sensor, a magnetic proximity sensor, an infrared proximity sensor, etc. Further, a capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer touches the touch screen.

Further, the proximity sensor senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions (for example, a call signal incoming tone, a message incoming tone, etc.) performed in the mobile terminal 100. The audio output module 152 can include a receiver, a speaker, a buzzer, etc.

In addition, the alarm 153 outputs a signal for indicating the generation of an event of the mobile terminal 100. For example, alarms can be generated when receiving a call signal, receiving a message, inputting a key signal, inputting touch, etc. The alarm 153 can also output signals in forms different from video signals or audio signals, for example, a signal for indicating generation of an event through vibration. The video signals or the audio signals from the alarm 153 can be also output through the display unit 151 or the audio output module 152.

Also, the haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Further, the haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 can also not only transmit haptic effects through direct contact but also allow the user to feel haptic effects through a kinesthetic sense of the user's fingers or arms. The mobile terminal 100 can also include multiple haptic modules 154.

In addition, the memory (or storage unit) 160 can store program(s) for the operation of the controller 180 and temporarily store input/output data (for example, phone book, messages, still images, moving images, etc.). The memory 160 can also store data about vibrations and sounds in various patterns, which are output from when a touch input is applied to the touch screen.

Further, the memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk, an optical disk, a memory stick, etc. The mobile terminal 100 can also operate in relation to a web storage performing the storing function of the memory 160 on the Internet or other network. The memory 160 or part thereof can be referred to as a location information storage unit if it stores location information therein.

The interface 170 serves as a path to external devices connected to the mobile terminal 100. External devices can be other mobile terminals, stationary terminals, auxiliary devices, etc. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, an earphone port, etc., for example.

In addition, the interface 170 can also interface with a user identification module that is a chip that stores information for authenticating the authority to use the mobile terminal 100. For example, the user identification module can be a user identify module (UIM), a subscriber identify module (SIM) and a universal subscriber identify module (USIM). An identification device including the user identification module can also be manufactured in the form of a smart card. Accordingly, the identification device can be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

In addition, the controller 180 controls the overall operations of the mobile terminal. For example, the controller 180 performs control and processing for voice communication, data communication and video telephony. As shown in FIG. 1, the controller 180 also includes a multimedia module 181 for playing multimedia. Also, the multimedia module 181 can be included in the controller 180 as shown in FIG. 1 or can be separated from the controller 180.

Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Figure 2A:
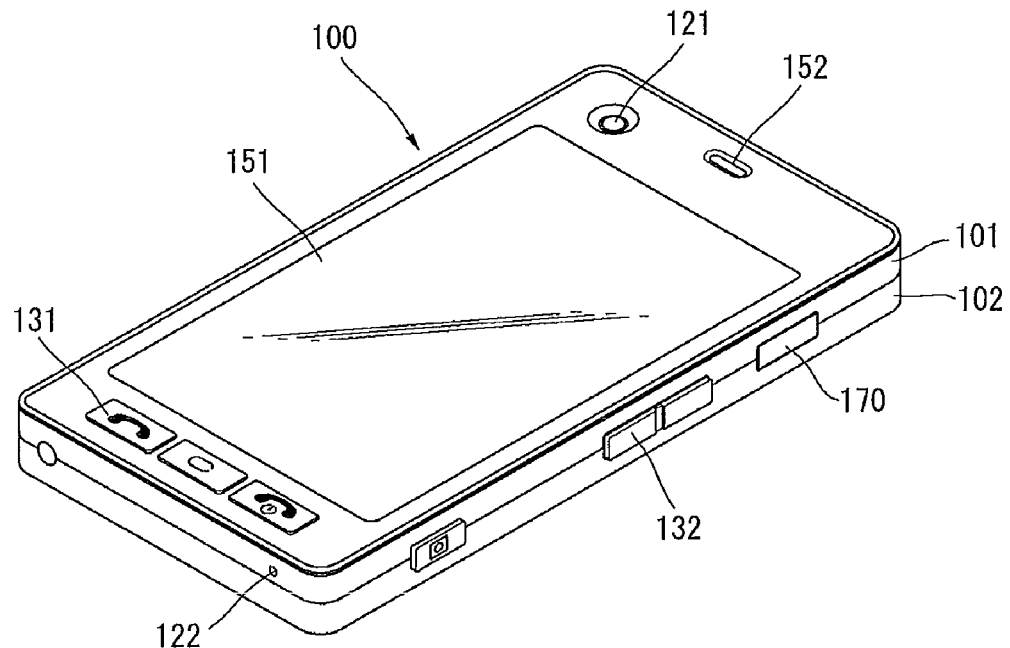
FIG. 2A illustrates a frontal perspective view of a mobile terminal related to one embodiment of the present invention.

Next, FIG. 2A is a front perspective view of a mobile terminal or a handheld terminal 100 according to an embodiment of the present invention. In this example, the handheld terminal 100 is a bar type terminal body. However, the present invention is not limited to a bar type terminal and can be applied to terminals of various types including, e.g., slide type, folder type, swing type and swivel type terminals.

In addition, the terminal body includes a case (a casing, a housing, a cover, etc.) forming the exterior of the terminal 100. In the present embodiment, the case is divided into a front case 101 and a rear case 102. Further, various electronic components are arranged in the space formed between the front case 101 and the rear case 102. At least one middle case can also be additionally arranged between the front case 101 and the rear case 102. Also, the cases can be formed of plastics through injection molding or made of a metal material such as stainless steel (STS) or titanium (Ti).

As shown in FIG. 2A, the display unit 151, the audio output unit 152, the camera 121, user input units 131 and 132, the microphone 122 and the interface 170 are arranged in the terminal body, specifically, in the front case 101. In addition, the display unit 151 occupies most of the main face of the front case 101.

Further, the audio output unit 152 and the camera 121 are arranged in a region in proximity to one of both ends of the display unit 151. Also, the user input unit 131 and the microphone 122 are located in a region in proximity to the other end of the display unit 151. Also include is another user input unit 132, which is arranged with the interface 170 on the sides of the front case 101 and the rear case 102.

Thus, in this embodiment, the user input unit 130 includes multiple operating units (user input units) 131 and 132 that are operated to receive commands for controlling the operation of the handheld terminal 100. Further, the operating units 131 and 132 can be referred to as manipulating portions and employ any tactile manner in which a user operates the operating units 131 and 132 while producing a tactile feeling.

Also, the operating units 131 and 132 can receive various inputs. For example, the operating unit 131 receives commands such as start and end a call, and the operating unit 132 receives commands such as to control the volume of the sound output from the audio output unit 152 or to convert the display unit 151 into a touch recognition mode.

Figure 2B:
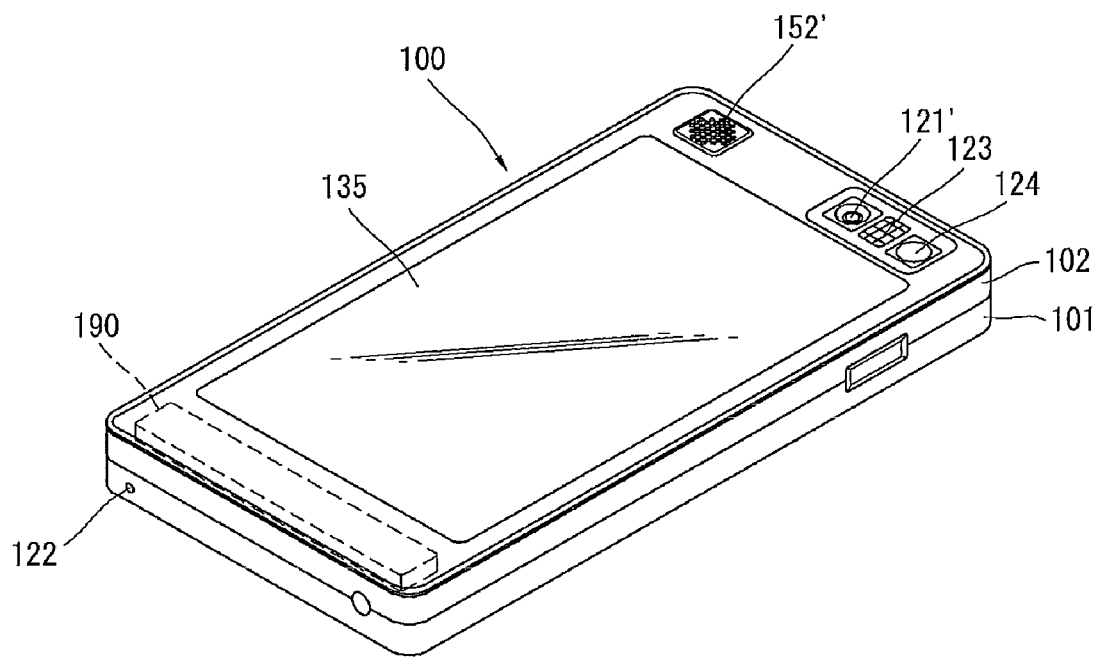
FIG. 2B is a rear perspective view of a mobile terminal related to one embodiment of the present invention.

Next, FIG. 2B is a rear perspective view of the handheld terminal shown in FIG. 2A according to an embodiment of the present invention. As shown in FIG. 2B, a camera 121' is additionally attached to the rear side of the terminal body, that is, the rear case 102. In this configuration, the camera 121' has a photographing direction that is opposite to that of the camera 121 shown in FIG. 2A and can have pixels different from those of the camera 121 shown in FIG. 2A.

For example, in one example, it is preferable that the camera 121 has low pixels such that it can capture an image of the face of a user and transmit the image to a receiving part during video telephony while the camera 121' has high pixels such that it can capture an image of a general object and does not immediately transmit the image in many situations. The cameras 121 and 121' can also be attached to the terminal body such that they can be rotated or popped-up.

As shown in FIG. 2B, a flash bulb 123 and a mirror 124 are additionally arranged in proximity to the camera 121'. The flash bulb 123 lights an object when the camera 121' takes a picture of the object, and the mirror 124 is used for the user to look at his or her face when the user wants to take a picture of themselves using the camera 121'.

An audio output unit 152' is also additionally provided on the rear side of the terminal body. In this embodiment, the audio output unit 152' can achieve a stereo function with the audio output unit 152 shown in FIG. 2A and be used in a speaker phone mode when the terminal is used for a telephone call.

A broadcasting signal receiving antenna can also be additionally attached to a side of the terminal body in addition to an antenna for telephone calls. The antenna forming a part of the broadcasting receiving module 111 shown in FIG. 1 can be set in the terminal body such that the antenna can be pulled out of the terminal body.

In addition, the power supply 190 for providing power to the handheld terminal 100 is set in the terminal body, and can be included in the terminal body or detachably attached to the terminal body. FIG. 2B also illustrates a touch pad 135 for sensing touch additionally attached to the rear case 102 of the terminal 100. Further, the touch pad 135 can be a light transmission type as the display unit 151. In this instance, when the display unit 151 outputs visual information through both sides, the visual information can be recognized through the touch pad 135.

Also, the information output through both sides of the display unit 151 can be controlled by the touch pad 135. In addition, a display can be additionally attached to the touch pad 135 such that a touch screen can be arranged even in the rear case 102. Further, the touch pad 135 operates in connection with the display unit 151 of the front case 101, and can be located in parallel with the display unit 151 behind the display unit 151. The touch panel 135 can also be identical to or smaller than the display unit 151 in size.

The interoperations of the display unit 151 and the touch pad 135 will now be described with reference to FIGS. 3A and 3B. In more detail, FIGS. 3A and 3B are front views of the handheld terminal 100 and are used for explaining an operating state of the handheld terminal according to an embodiment of the present invention.

The display unit 151 can display various types of visual information in the form of characters, numerals, symbols, graphic or icons. To input the information, at least one of the characters, numerals, symbols, graphic and icons are displayed in predetermined arrangement in the form of a keypad. Also, the keypad can be referred to as a 'soft key'.

Figure 3A:
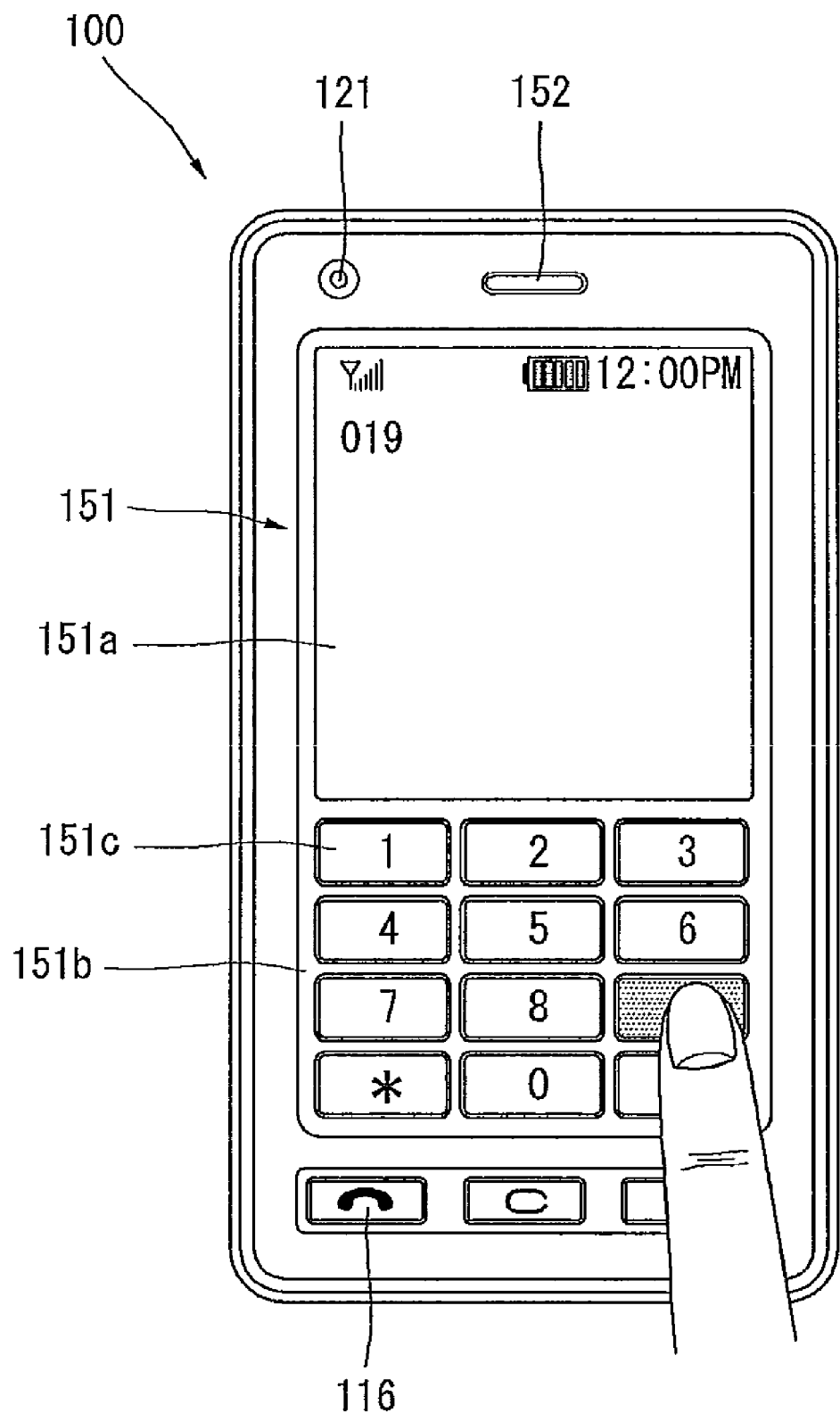
FIGS. 3A and 3B are front views of a mobile terminal for describing one operating status of a mobile terminal related to the present invention.
Figure 3B:
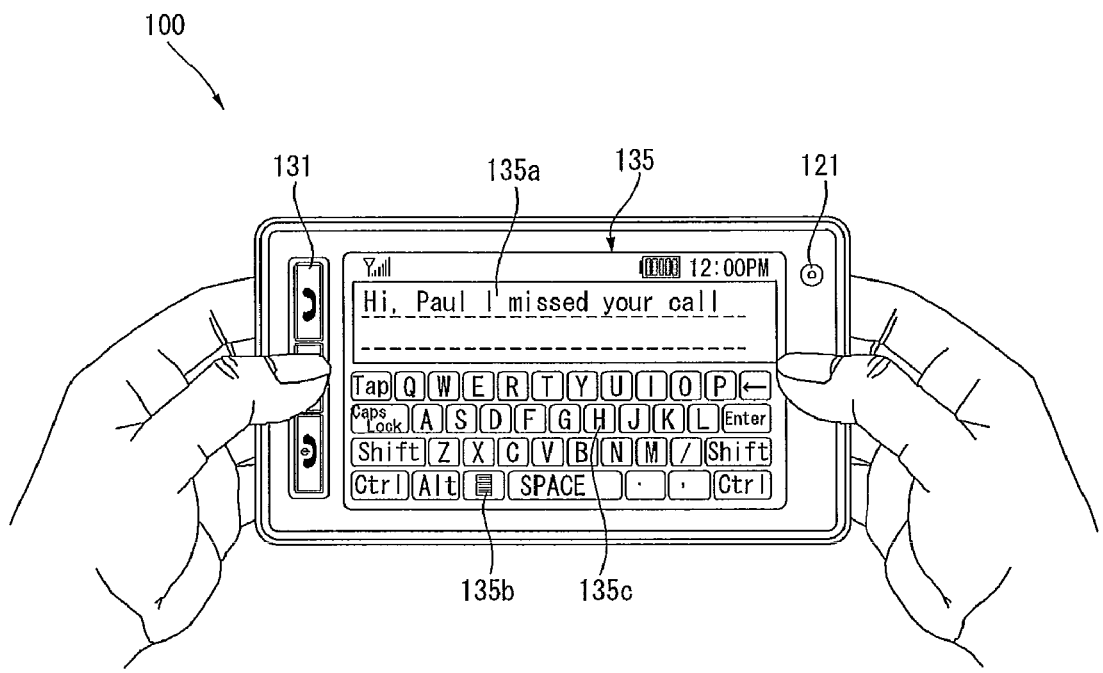

Further, FIG. 3A shows that touch applied to a soft key is input through the front side of the terminal body. The display unit 151 can be a single area or can be divided into a plurality of regions. In the latter instance, the display unit 151 is constructed such that the plurality of regions interoperate with each other.

For example, and as shown in FIG. 3A, an output region 151a and an input region 151b are respectively displayed in upper and lower parts of the display unit 151. The input region 151b displays soft keys 151c that represent numerals used to input numbers such as telephone numbers. Thus, when a soft key 151c is touched, a numeral corresponding to the touched soft key is displayed on the output region 151a. Further, when the user operates a first operating unit 116, a connection of a call corresponding to a telephone number displayed on the output region 151a is attempted.

Next, FIG. 3B is an overview of the mobile terminal 100 showing that touch applied to soft keys is input through the rear side of the terminal body. FIG. 3B also shows the landscape of the terminal body while FIG. 3A shows the portrait of the terminal body. In addition, the display unit 151 is constructed such that an output image is converted according to the direction in which the terminal body is located.

Further, FIG. 3B shows the operation of the handheld terminal in a text input mode. As shown, the display unit 151 includes a touch pad display 135 having an output region 135a and an input region 135b. A plurality of soft keys 135c indicating at least one of characters, symbols and numerals are also arranged in the input region 135b. Further, in this embodiment, the soft keys 135c are arranged in the form of QWERTY keys.

Thus, when the soft keys 135c are touched through the touch pad 135, the characters, numerals and symbols corresponding to the touched soft keys 135c are displayed on the output region 135a. Touch input through the touch pad 135 can prevent the soft keys 135c from being covered with user's fingers when the soft keys 135c are touched as compared to touch input through the display unit 151. Further, when the display unit 151 and the touch pad 135 are transparent, the user can see his or her fingers located behind the terminal body, and thus can select items by touching the backside or surface of the displayed keys 135c.

In addition, the user can scroll the display unit 151 or the touch pad 135 to move an object displayed on the display unit 151, for example, by using a cursor or a pointer located on an icon. Also, when the user moves his or her finger on the display unit 151 or the touch pad 135, the controller 180 can visually display the user's finger moving path on the display unit 151. This is useful to edit an image displayed on the display unit 151.

Also, when the display unit 151 (touch screen) and the touch pad 135 are simultaneously touched within a predetermined period of time, a specific function of the terminal can be executed. For example, the user can clamp the terminal body using their thumb and index finger. This specific function can include activating or deactivating the display unit 151 or the touch pad 135, for example.

The proximity sensor described with reference to FIG. 1 will now be explained in more detail with reference to FIG. 4. That is, FIG. 4 is a conceptual diagram used for explaining a proximity depth of the proximity sensor.

Figure 4:
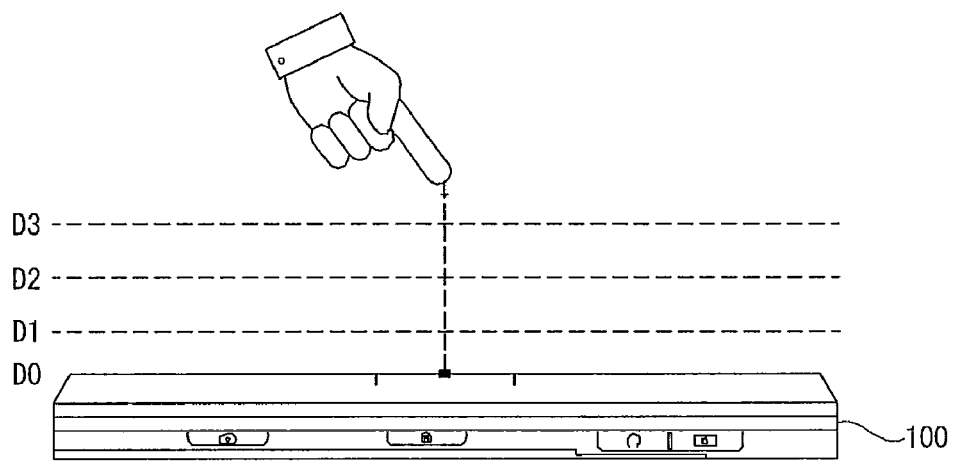
FIG. 4 illustrates a conceptual drawing for describing a proximity range of a proximity sensor.

As shown in FIG. 4, when a pointer such as a user's finger approaches the touch screen, the proximity sensor located inside or near the touch screen senses the approach and outputs a proximity signal. Further, the proximity sensor can be constructed such that it outputs a proximity signal according to the distance between the pointer approaching the touch screen and the touch screen (referred to as "proximity depth").

Also, the distance in which the proximity signal is output when the pointer approaches the touch screen is referred to as a detection distance. The proximity depth can be determined using a plurality of proximity sensors having different detection distances and comparing proximity signals respectively output from the proximity sensors.

FIG. 4 shows the section of the touch screen in which proximity sensors capable of sensing three proximity depths are arranged. Of course, proximity sensors capable of sensing less than three or more than three proximity depths can be arranged in the touch screen.

Thus, as shown in FIG. 4, when the pointer (user's finger in this example) completely comes into contact with the touch screen (D0), the controller 180 recognizes this action as the contact touch. On the other hand, when the pointer is located within a distance D1, for example, from the touch screen, the controller 180 recognizes this action as a proximity touch of a first proximity depth.

Similarly, when the pointer is located in a range between the distance D1 and a distance D2 from the touch screen, the controller 180 recognizes this action as a proximity touch of a second proximity depth. When the pointer is located in a range between the distance D2 and a distance D3 from the touch screen, the controller 180 recognizes this action a proximity touch of a third proximity depth. Also, when the pointer is located at longer than the distance D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen and perform various operations according to the input signals.

The mobile device 100 of FIG. 1 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 5A:
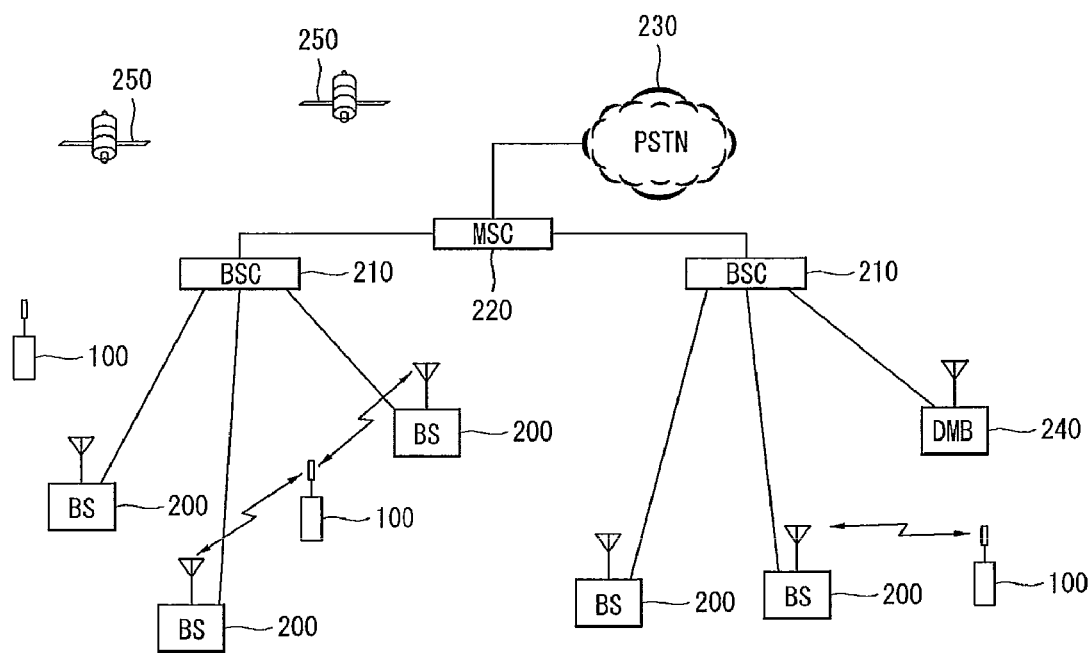
FIG. 5A illustrates a block diagram of CDMA wireless communication system communicating with the mobile terminal illustrated in FIG. 1.
Figure 5B:
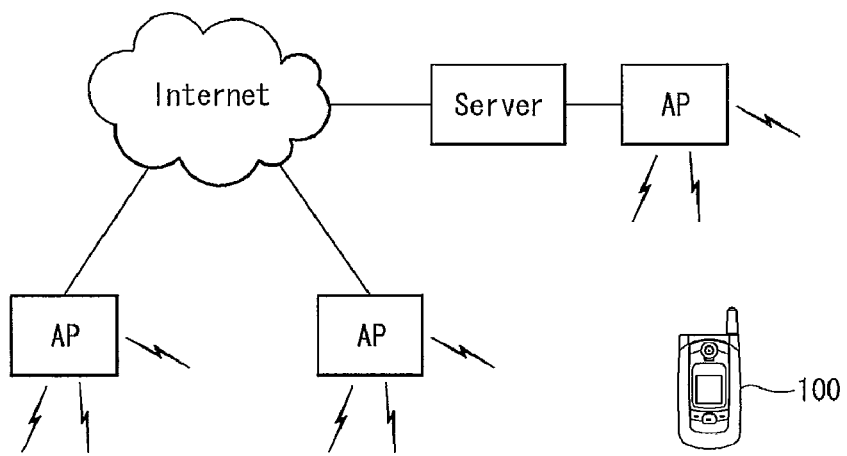
FIG. 5B illustrates an example of a wireless LAN system communicating with the mobile terminal illustrated in FIG. 1.

Referring now to FIG. 5A, a CDMA wireless communication system is shown having a plurality of mobile devices 100, a plurality of base stations 200, base station controllers (BSCs) 210, and a mobile switching center (MSC) 220. The MSC 220 is configured to interface with a conventional public switch telephone network (PSTN) 230. The MSC 220 is also configured to interface with the BSCs 210. The BSCs 210 are coupled to the base stations 200 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 210.

Each base station 200 may include one or more sectors, each sector having an omnidirectional antenna or an antenna pointed in a particular direction radially away from the base station 270. Alternatively, each sector may include two antennas for diversity reception. Each base station 200 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 200 may also be referred to as base station transceiver subsystems (BTSs). In some cases, the term "base station" may be used to refer collectively to a BSC 210, and one or more base stations 200. The base stations may also be denoted "cell sites." Alternatively, individual sectors of a given base station 200 may be referred to as cell sites.

A terrestrial digital multimedia broadcasting (DMB) transmitter 240 is shown broadcasting to portable devices 100 operating within the system. The broadcast receiving module 111 (FIG. 1) of the portable device is typically configured to receive broadcast signals transmitted by the DMB transmitter 240. Similar arrangements may be implemented for other types of broadcast and multicast signaling (as discussed above).

FIG. 5A further depicts several global positioning system (GPS) satellites 250. Such satellites facilitate locating the position of some or all of the portable devices 100. Two satellites are depicted, but it is understood that useful positioning information may be obtained with greater or fewer satellites. The position information module 115 (FIG. 1) of the portable device 100 is typically configured to cooperate with the satellites 250 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 200 receive sets of reverse-link signals from various mobile devices 100. The mobile devices 100 are engaging in calls, messaging, and other communications. Each reverse-link signal received by a given base station 200 is processed within that base station. The resulting data is forwarded to an associated BSC 210. The BSC provides call resource allocation and mobility management functionality including the orchestration of soft handoffs between base stations 200. The BSCs 210 also route the received data to the MSC 220, which provides additional routing services for interfacing with the PSTN 230. Similarly, the PSTN interfaces with the MSC 220, and the MSC interfaces with the BSCs 210, which in turn control the base stations 200 to transmit sets of forward-link signals to the mobile devices 100.

Figure 5C:
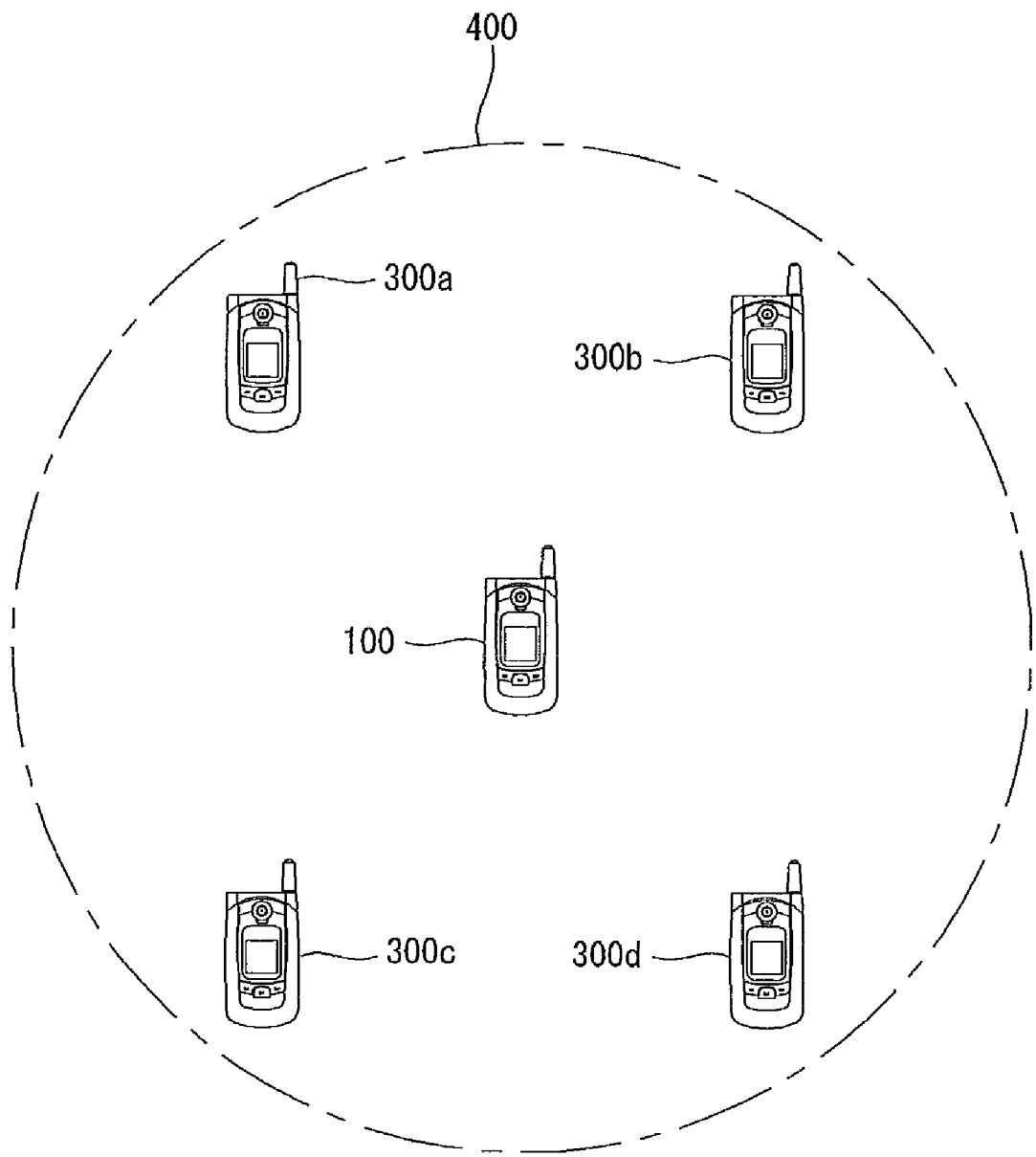
FIG. 5C illustrates one example of a short range communication environment of a mobile terminal 100 according to the present invention.

The mobile terminal 100, as described earlier, can carry out short range communication. FIG. 5C illustrates a short range communication environment (local area communication) for a mobile terminal 100.

The mobile terminal 100 can carry out short range communication by using the local area communication module 114 with external electronic devices 300a, 300b, 300c, 300d located within communication range accommodated by a short range communication method. Here, the external electronic devices 300a-300d are shown as mobile phones only as examples, and they can be any other types of electronic devices, e.g., computers, TVs, navigation devices, kiosks, etc.

In what follows, embodiments of the present invention will be described. The various embodiments and examples of the present invention can be implemented in the device(s) or system(s) of FIGS. 1-5C, but can be implemented in other suitable device/system. Further, in each embodiment, one or more features discussed in connection with any other embodiment(s) can be equally applied to that embodiment.

The memory 160 can store a map. The map is either pre-stored in the memory 160 or received from the outside through the radio communication unit 110. When the map is received from the outside, the map can be either stored permanently or temporarily in the memory 160.

A message referred to in the present document may include a short message service (SMS), a multimedia messaging service (MMS), and e-mail.

If the message is SMS or MMS, the message can be transferred or received through the mobile communication module 112. On the other hand, if the message corresponds to an e-mail, the message can be transferred or received through the wireless Internet module 113.

First Embodiment-Transfer Location Information with a Message

A method for transferring data of a mobile terminal and a mobile terminal for implementing the method according to a first embodiment of the present invention described later are related to a mobile terminal that can transfer a message and location information together and a method for transferring data using the mobile terminal.

Whether to carry out transferring a message and location information together depends on a user's selection or current setting of the mobile terminal 100. In what follows, embodiments of transferring a message and location information together will be described in various ways.

Figure 6:
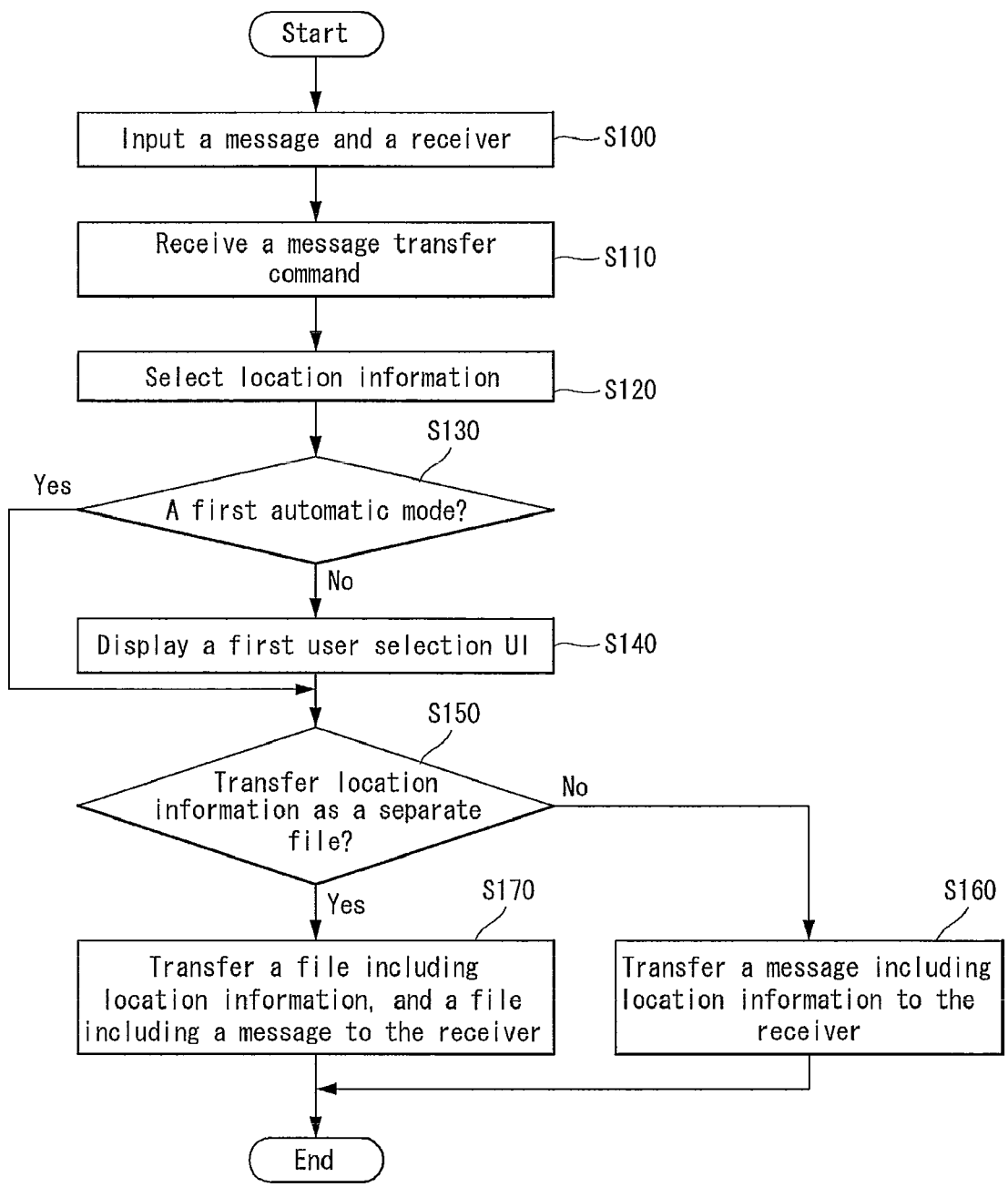
FIG. 6 illustrates a flow diagram of a method for transferring messages of a mobile terminal according to a first embodiment of the present invention.

FIG. 6 illustrates a method for transferring data of a mobile terminal according to a first embodiment of the present invention. A method for transferring data of a mobile terminal according to the first embodiment of the present invention can be implemented in a mobile terminal 100 described with reference to FIGS. 1 to 5C. In the following, with reference to FIG. 6 and related drawings, the method for transferring data of a mobile terminal according to thee first embodiment of the present invention and operations of a mobile terminal 100 to implement the method are described in detail Referring to FIG. 6, the controller 180 receives a message and information on a receiver to which the message is to be sent through the user input unit 130, at step S100. Here, the receiver to which the message is to be sent can be a recipient (person or device) of the message, which may be identified by using an address, a phone number, a URL, etc. The message that the controller 180 receives may be generated by the user using the user input unit 130.

In the S100 step, the order of inputting the message and the receiver of the message can be changed. For example, the receiver of the message can be input after the message has been input; the receiver of the message can be input while the message is being input or the receiver can be input before the message is input.

Figure 7:
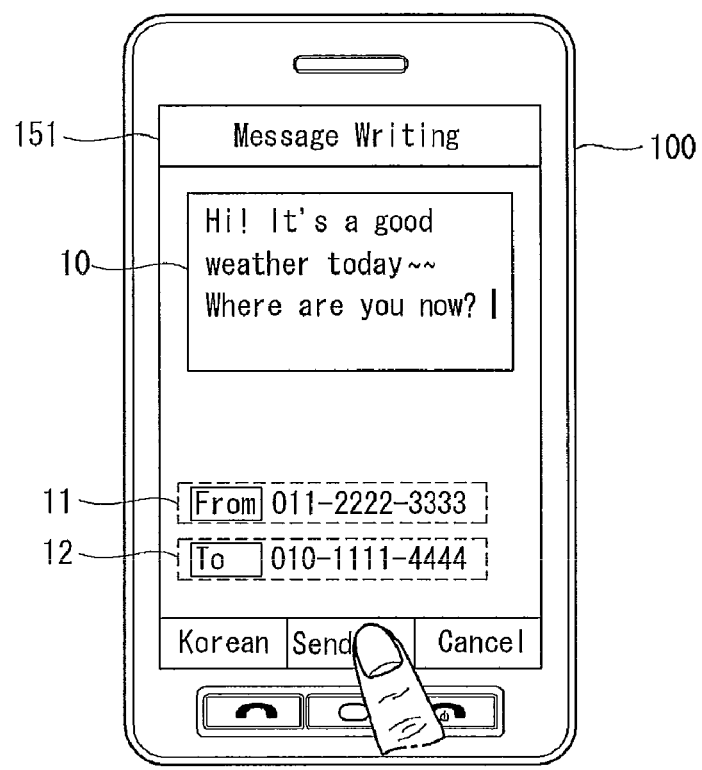
FIG. 7 illustrates an example of a message writing screen where a message and a receiver have been input according to the present invention.

FIG. 7 illustrates an example of a screen of a mobile terminal for writing a message where a message and a receiver are specified. A message writing screen shown in FIG. 7 can include a message input area 10, a sender information area 11, and a receiver (recipient) input area 12. The user inputs the contents to be sent in the message input area 10 and inputs information about the receiver of the message through the receiver input area 12. The receiver can be set by searching a phone book stored in the memory 160 or by the user's manual input of a phone number or other data identifying the receiver/recipient.

The controller 180 can receive a message transfer command from the user at step S110. The message transfer command can be received in various ways. For example, with reference to FIG. 7, if the display unit 151 is a touch screen, the message transfer command can be transferred to the controller 180 when the user touches, e.g., a <send> button. Also, the user can transfer the message transfer command to the controller 180 by manipulating the user input unit 130.

The controller 180 can select location information to be transferred with the message at step S120.

Here, various types of the location information can be used and selected at the S120 step. The selected location information can be location information about a current location of the mobile terminal 100 (e.g., current location of the sender) or other location information excluding this current location information, or both.

For example, the controller 180 can select location information stored in the memory 160 or location information included in the contents stored in the memory 160 as the location information to be transferred together with the message according to a selection signal of the user.

Also, the controller 180 can select location information to be transferred together with the message by obtaining location information about a current location of the mobile terminal 100 by controlling the position information module 115.

The controller 180 can provide a separate user interface to be used for selecting the location information. Also, the controller 180 can provide a user interface for selecting location information stored in the memory 160 according to a predefined setting or automatically obtain location information about a current location of the mobile terminal 100, thus using the obtained location information as the location information to be transferred together with the message.

The location information, as described above, can be acquired in various ways such as Global Navigation Satellite System (GNSS), cell identification (cell-ID), and wireless LAN-based location sensing technique.

The location information can include latitude and longitude information. For example, the location information can include latitude and longitude information such as "37 degrees 29 minutes 54 seconds North, 127 degrees 1 minute 37 seconds East". Also, the location information can include a geographical name corresponding to the latitude and longitude information. The controller 180, by using map data stored in the memory 160, can obtain a geographical name corresponding to the latitude and longitude information. For example, a geographical name corresponding to "37 degrees 29 minutes 54 seconds North, 127 degrees 1 minute 37 seconds East" can be "Gangnam station".

The execution time of the S120 step can be varied. Although FIG. 6 illustrates a case where the S120 step is carried out after the execution of the steps of S100 and S110, embodiments described in the present document are not limited by the illustrated case. For example, the S120 step can be carried out right after a message writing screen shown in FIG. 7 is activated or the S120 step can be carried out at the same time of the activation. Also, the controller 180, irrespective of the activation of the message writing screen, can periodically obtain location information about a current location of the mobile terminal 100. The memory 160 can store location information about a current location of the mobile terminal 100. If the controller 180 obtains the location information periodically, location information about a current location of the mobile terminal 100 stored in the memory 160 can be updated periodically.

The controller 180 determines whether a mode for location information transfer is set as automatic (hereinafter, it is referred to as a "first automatic mode") S130. The controller 180, if the mode for location information transfer is set as manual rather than the first automatic mode, can display a user interface (UI; hereinafter, it is referred to as a "first user selection UI") through which the user can select a data structure (e.g., whether to use separate files) of the location information to be transferred to the receiver S140.

Figure 8:
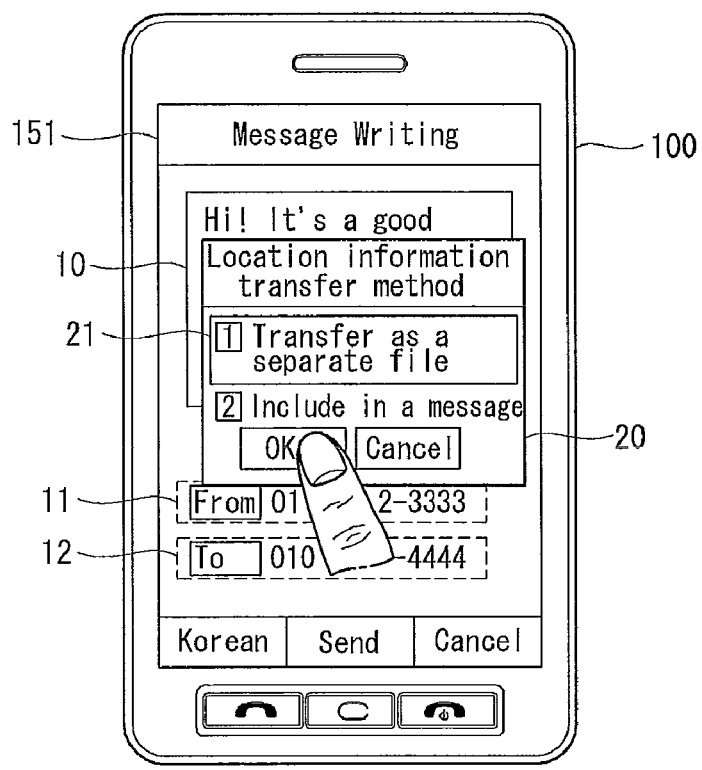
FIG. 8 illustrates an example of a screen displaying a first user selection UI 20 according to the present invention.

FIG. 8 illustrates an example of a screen displaying such a first user selection UI 20. The first user selection UI 20 can include an inquiry for the user to decide whether to transfer the location information about the current location of the mobile terminal 100 as a separate file together with a file containing the input message or to transfer the location information as being included in the message. The reference number 21 of FIG. 8 is an indicator 21 for specifying a currently selected item.

The controller 180, if the mode for location information transfer is set as the first automatic mode, carries out S150 step to be described later without, displaying the first user selection UI 20 on the screen.

The controller 180 determines whether a current setting mode of the first automatic mode or the user's selection through the first user selection UI 20 specifies transferring the location information as a separate file together with the message at step S150. For instance, the message would be contained in a file separate from the file containing the location information, although the two files would be transferred/transmitted together at the same time.

The controller 180, according to the determination of the step S150, either transfers a message including the location information therein to the receiver at S160 or transfers a file including the location information to the receiver together with the message contained in a separate file at step S170. Here, the location information may be related to the message, but may not be.

The controller 180, in the S160 step, can transfer the location information being included in the message after preparing the location information as text information or transfer the location information being recorded in a particular field reserved in a data structure of the message.

In the S170 step, the file including the location information being transferred as a separate file together with the file containing the message can take various forms.

The location information can include latitude and longitude information. The file including the location information can take such a form that the latitude and longitude information are recorded in predefined fields, respectively. For example, the file including the location information can be prepared in the form of V-Object. Typical examples of a V-Object file are V-Card and V-Calendar.

V-Card is a protocol designed for carrying out the same functions as electronic business cards, which is a data stream provided in a compatible format irrespective of types of systems or applications. A data stream for each user can include a name, address, phone number, e-mail address, Internet URL, photo, company logo, and sound file information and at the time of transferring a data stream, can be transferred to a third party being attached to an electronic mail through MIME encoding.

V-Calendar is a protocol designed for sharing schedule information among people who may use different calendars or daily planner programs by providing electronic calendaring and a scheduling format. V-Calendar can include data streams and to-do lists and events thereof are represented in a standard format and can be transferred to a third party for data sharing being attached to an electronic mail through MIME encoding.

FIG. 9 illustrates an example of a V-Card file. Location information prepared in the form of V-Object can take a structure similar to that of V-Card shown in FIG. 9. For example, location information prepared in the form of V-Object can include data fields such as "title", "latitude", and "longitude".

Also, the file including the location information can include the location information in the form of a text.

When the location information and the message are managed and transferred as separate files, the message can include information related to the location information in a particular field. On the other hand, the file including the location information can include information related to the message in a particular field. Or, information indicating a relationship between the location information and the message can be transferred in the form of separate control information; this is because a message and location information transferred as separate files should be recognizable by a receiver (device receiving the message).

The file including the location information, the file being able to be prepared in various ways, can be managed as a separate file from the message, thereby helping the receiver/recipient easily recognize and use the location information.

Second Embodiment-Selective Transfer of Location Information in Accordance to a Receiver of a Message A method for transferring data of a mobile terminal and a mobile terminal for implementing the method according to a second embodiment of the present invention described later is related to a mobile terminal that can transfer location information selectively according to a receiver at the time of transferring a message and a method using the mobile terminal. Depending on a receiver, location information may or may not be transferred. In what follows, embodiments for selective transfer of location information according to a receiver of a message will be described in various ways.

Figure 10:
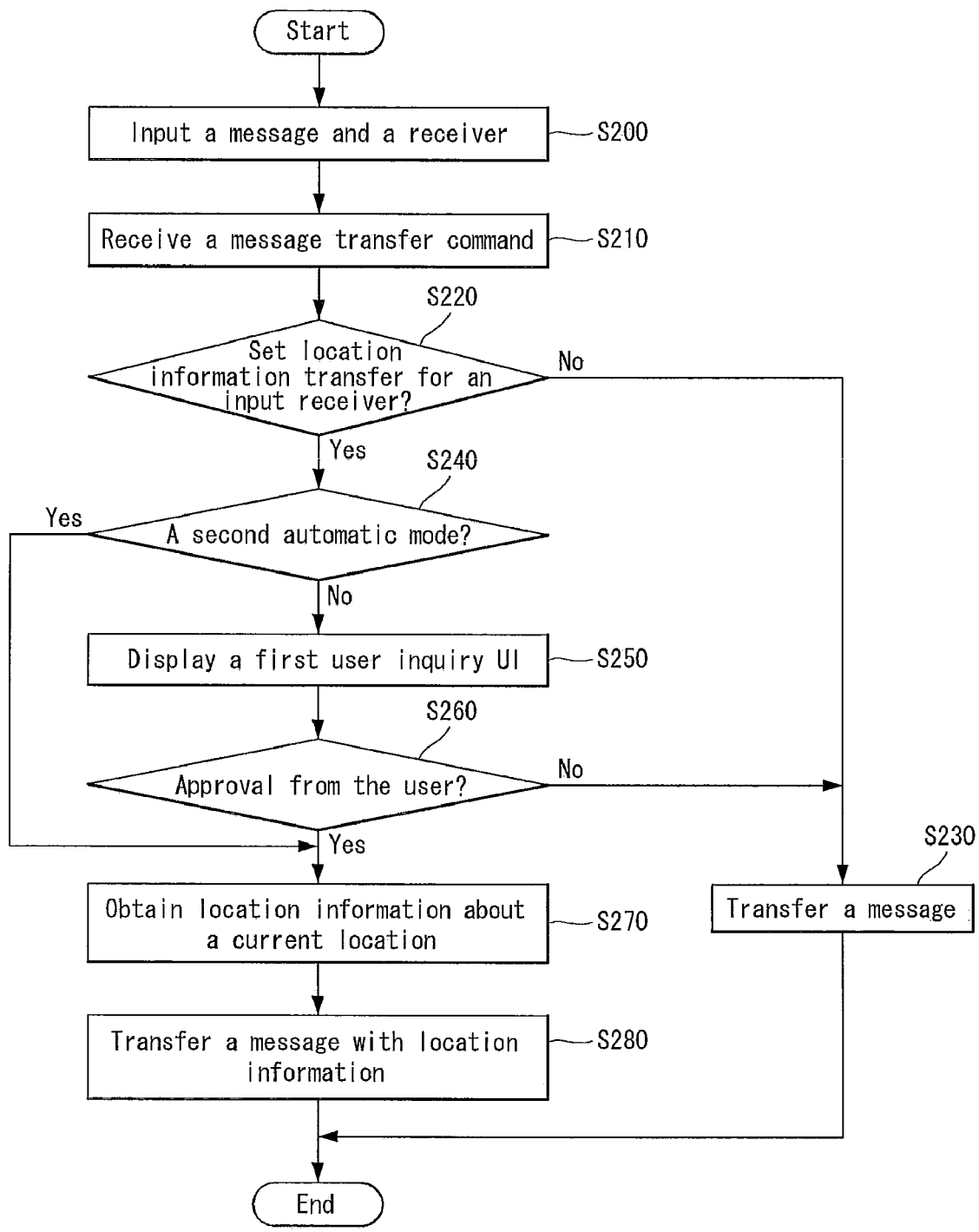
FIG. 10 illustrates a flow diagram of a method for transferring messages of a mobile terminal according to a second embodiment of the present invention.

FIG. 10 illustrates a method for transferring data of a mobile terminal according to a second embodiment of the present invention. The method for transferring data of a mobile terminal according to the second embodiment of the present invention can be implemented in a mobile terminal 100 described with reference to FIGS. 1 to 5C. In the following, with reference to FIG. 10 and related drawings, the method for transferring data of a mobile terminal according to the second embodiment of the present invention and operations of a mobile terminal 100 to implement the method are described in detail.

Referring to FIG. 10, the controller 180 can receive a message and a receiver to which the message is to be sent through the user input unit 130, at step S200 and can receive a message send/transfer command from the user at step S210. The steps of S200 and S210 are the same as or similar to the steps of S100 and S110 of FIG. 6, respectively.

The controller 180 determines a location information transfer mode for managing transfer of location information at step S220, which indicates that the message is to be transmitted/transferred either with the location information or without the location information. Particularly, the controller 180 determines if the location information transfer mode is set as 'transfer' with respect to the receiver of the message, at step S220. The 'transfer' would indicate that the location information is to be transmitted with the message. For instance, for each specific receiver of messages, e.g., for each destination phone number or recipient, the mobile terminal 100 can be set up to send messages with or without location information to that receiver. As a result, different receivers can selectively and automatically receive messages with or without location information.

The location information transfer mode indicates a management mode about whether to transfer location information together at the time of transferring a message to a particular receiver. The location information transfer mode can be stored in the memory 160 of the mobile terminal 100 (of the sender) for each of different receivers that can receive messages. For instance, for each of the different receivers of messages, a specific location information transfer mode may be set and stored in the memory 160 of the mobile terminal 100.

The location information transfer mode can be set in various ways. For example, the location information transfer mode can be set by the user, separately and independently, for each of multiple receivers/recipients (or groups of multiple receivers/recipients) registered in a phonebook, address book or contact book stored in the memory 160.

Figure 11:
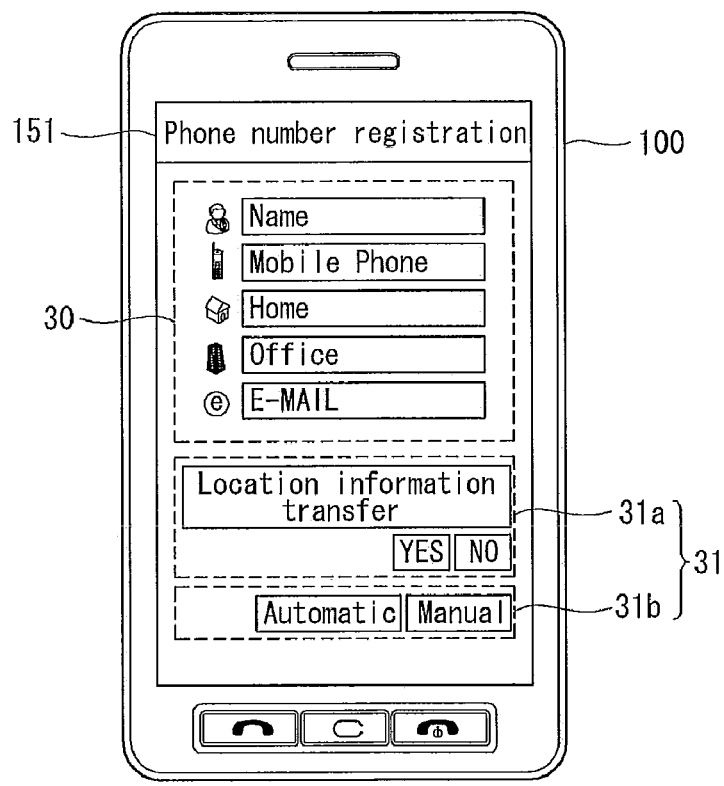
FIG. 11 illustrates an example of a screen registering an entity in a phonebook according to the present invention.

FIG. 11 illustrates an example of a screen registering a new entity in a phonebook of the mobile terminal 100. With reference to FIG. 11, a function for setting location information transfer through a phonebook registration screen can be provided. The controller 180 can provide the phonebook registration screen with a first input area 30 for receiving "name", "mobile phone number", "home phone number", "office phone number", "e-mail address", etc. and a second input area 31 for receiving or setting information about the location information transfer. The user can input or set information about the location information transfer of a particular phonebook entity/entry (e.g., for each recipient) through the second input area 31. The second input area 31 can include a first sub input area 31a to set whether to transfer location information and a second sub input area 31b to set whether or not to transfer the location information automatically.

For example, the location information transfer mode can be set in such a way that location information is transferred/sent to all the receivers (recipients) corresponding to the phone numbers that begin with particular numbers (or include particular numbers) such as "011", "02", or "070". Also, for example, the location information transfer mode can be set in such a way that location information is transferred to all the receivers corresponding to the phone numbers that correspond to a particular area, e.g., particular area code of phone numbers, or zip code of addresses. The controller 180 can recognize the particular area corresponding to a particular receiver by using a phone number (for example, a country code indicating a particular country or an area code indicating a particular area) or location information indicating a current location of a receiver.

The controller 180, if it is found at step S220 that the location information transfer mode for the input receiver is set as 'not transfer', transfers only the input message to the input receiver without the location information, in the same manner as a general situation at step S230.

The controller 180, if it is found at step S220 that the location information transfer mode for the input receiver is set as 'transfer', determines whether or not the location information transfer mode is set as automatic transfer mode (hereinafter, it is called a "second automatic mode"), at step S240.

The controller 180, if it is found at step S240 that the second automatic mode is not set, can display a user interface UI (hereinafter, it is called a "first user inquiry UI") for obtaining an approval for the transfer of the location information from the user, at step S250.

Figure 12:
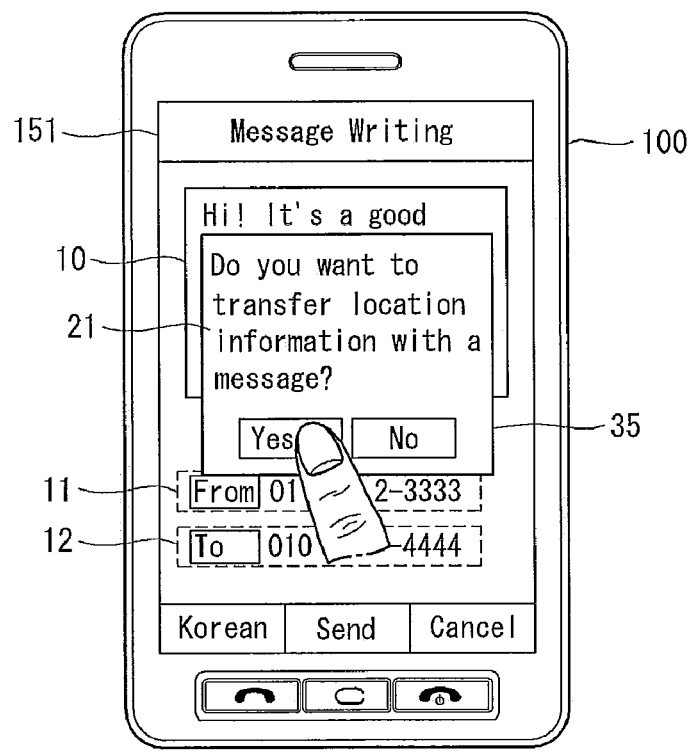
FIG. 12 illustrates an example of a screen displaying a first user inquiry UI 35 according to the present invention.

FIG. 12 illustrates an example of a screen displaying such a first user inquiry UI 35. The first user inquiry UI 35 shown in FIG. 12 can be displayed as the user selects a "Send" button on the screen of FIG. 7. The first user inquiry UI 35 can also include the contents or texts asking the user about whether or not to transfer location information about a current location of the mobile terminal 100 to the input receiver.

The controller 180 determines existence of an approval from the user through the first user inquiry UI 35, S260. The controller 180, if it is found at the S260 step that an approval from the user does not exist, carries out the S230 step described earlier.

The controller 180, if it is found at the S260 step that an approval from the user exists, obtains location information about a current location of the mobile terminal 100 by controlling the position information module 115, at step S270 and transfers the obtained location information and the input message together to the input receiver at step S280. The S270 step can be the same as or similar to the S120 step of FIG. 6. For instance, the location information here can indicate a current location of the mobile terminal 100 or can be other location information. The method for transferring the location information and the message at the S280 step can be implemented in various ways as the first embodiment of the present invention described above. For instance, the location information and the message can be sent together in one file or in multiple separate files.

Third Embodiment-Reduction of Data Size for Location Information

A method for transferring data of a mobile terminal and a mobile terminal for implementing the method according to a third embodiment of the present invention described later is related to a mobile terminal that can reduce the data size of location information and transfer the location information of the reduced data size together with a message and a method using the mobile terminal. If the data size of the location information is reduced, a burden for data processing in a network, a sender mobile terminal, and a receiver mobile terminal can be reduced. In what follows, embodiments for reducing the data size of location information will be described in various ways.

Figure 13:
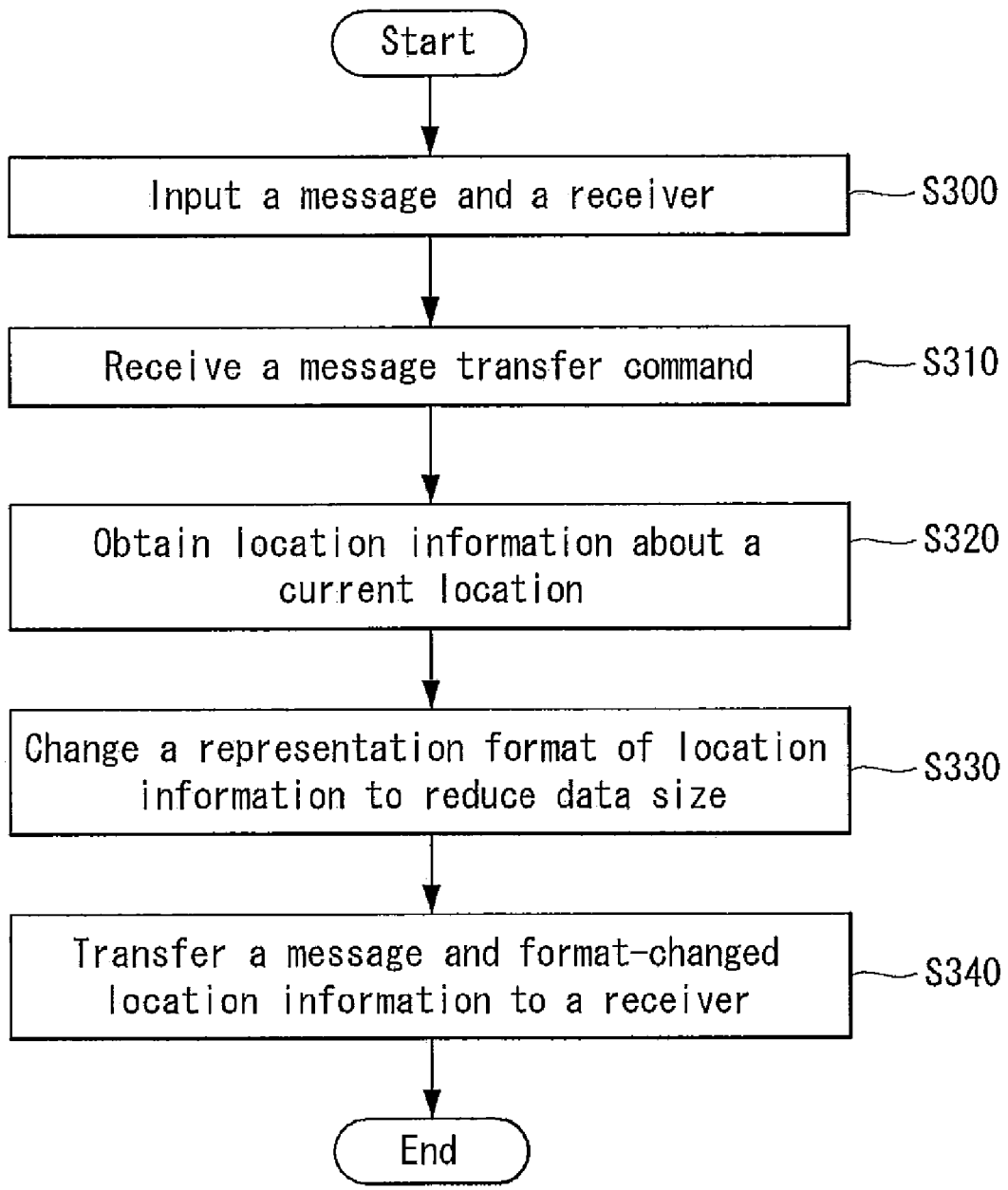
FIG. 13 illustrates a flow diagram of a method for transferring messages of a mobile terminal according to a third embodiment of the present invention.

FIG. 13 illustrates a flow diagram of a method for transferring data of a mobile terminal according to a third embodiment of the present invention. The method for transferring data of a mobile terminal according to the third embodiment of the present invention can be implemented in a mobile terminal 100 described with reference to FIGS. 1 to 5C. In what follows, with reference to FIG. 13 and related drawings, the method for transferring data of a mobile terminal according to the third embodiment of the present invention and a mobile terminal 100 for implementing the method will be described in detail.

Referring to FIG. 13, the controller 180 can receive a message and a receiver to which the message is to be sent through the user input unit 130, at step S300 and can receive a message send command from the user at step S310. The steps of S300 and S310 are the same as or similar to the steps of S100 and S110 of FIG. 6, respectively.

The controller 180 obtains location information about a current location of the mobile terminal 100 by controlling the position information module 115, at step S320. The S330 step is the same as or identical to the S120 step of FIG. 6.

The controller 180 can change the representation format of the obtained location information according to a predefined method to reduce the data size of the obtained location information at step S330.

In the S330 step, a method for changing the representation format of the obtained location information can be implemented in various ways. Some examples are as follows.

The location information, as described in the embodiments described above, can include latitude and longitude information. The latitude and longitude information can be expressed by coordinate values.

The controller 180 can change the representation format of the obtained location information by using a method of deleting a predefined number of digits corresponding to certain coordinate values about at least one of the latitude and longitude. Such digits may carry common values for various locations so that they can be eliminated. For instance, locations within one country may have same beginning values for the latitude and/or longitude so that they may not be needed. Examples are discussed below referring to FIGS. 14A-15.

Figure 14A:
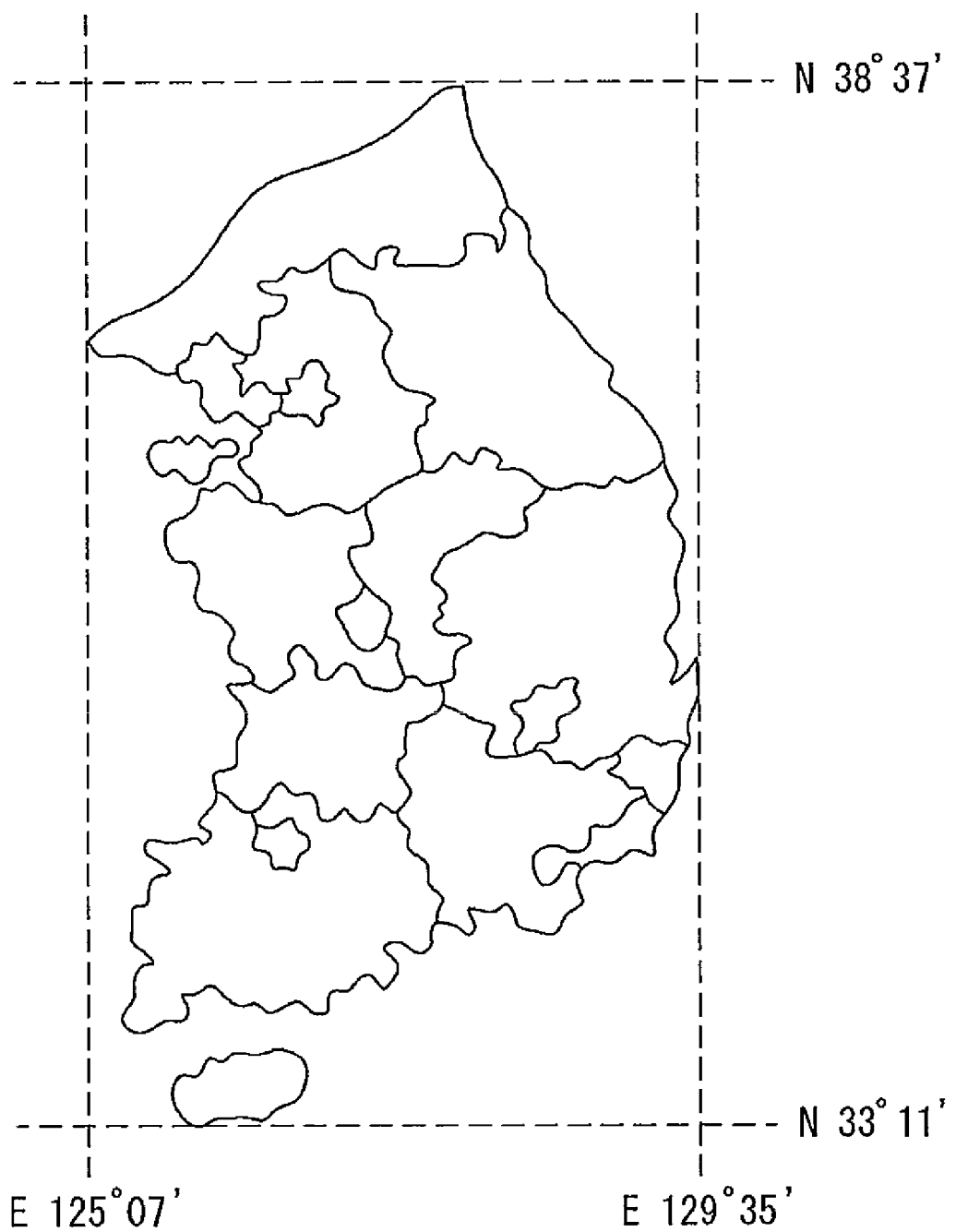
FIG. 14A illustrates an example of a latitude/longitude range of South Korea (Republic of Korea) according to the present invention.
Figure 14B:
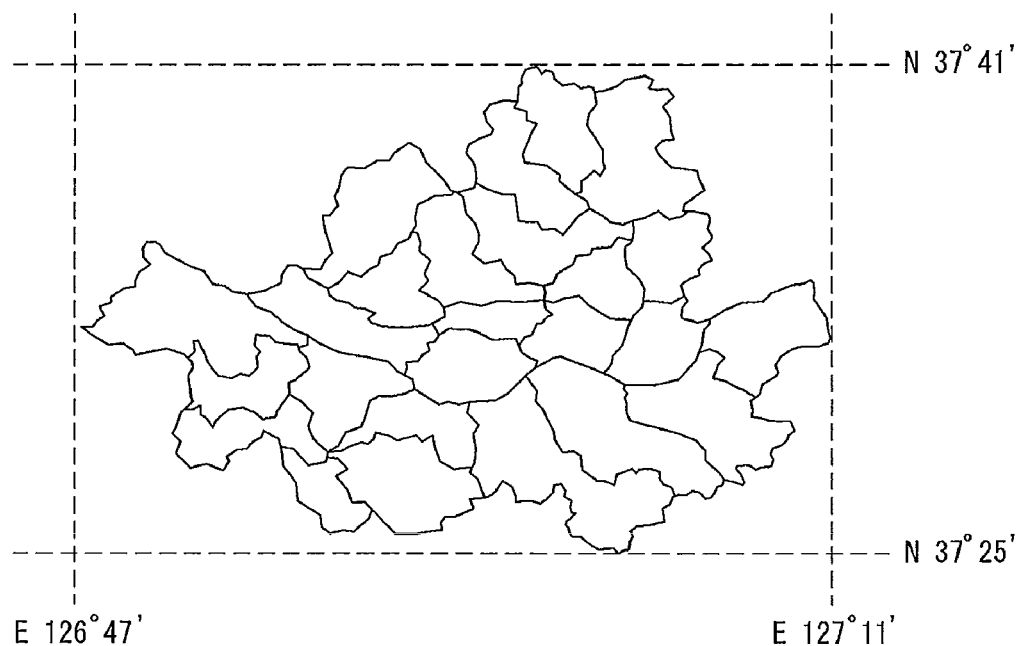
FIG. 14B illustrates an example of a latitude/longitude range of Seoul according to the present invention.

FIG. 14A illustrates the range of latitude and longitude of South Korea and FIG. 14B illustrates the range of latitude and longitude of Seoul, which is the capital of Korea.

With reference to FIG. 14A, the latitude for South Korea ranges about between 33 and 38 degrees of North and the longitude ranges about between 125 and 129 degrees of East (excluding Ulleung island). If location information is transferred between users living in South Korea, the location information can be transferred and received between these users, with the first digit value "3" of the latitude coordinate value ("33"-"38") and the first and second digit values "1" and "2" of the longitude coordinate value ("125"-"129") being deleted. Mobile terminals participating in transferring and receiving a latitude/longitude value with at least one of leading digits deleted can define in advance the number of digits to be deleted.

Also, if the range of Korea is narrowed down to a smaller area, more than two leading digits can be deleted from the digits constituting a latitude and longitude coordinate value. For example, with reference to FIG. 14B, the latitude for Seoul ranges about between N 37° 25' and N 37° 41' and the longitude for Seoul ranges about between E 126° 47' and E 127° 11'. Therefore, mobile terminals in Seoul can transfer and receive location information with each other, with the digit values "3" and "7" (i.e., 37°) corresponding to the first two digits of a latitude coordinate value and the digit values "1" and "2" (i.e., 12) corresponding to the first two digits of a longitude coordinate value deleted from the location information. That is, the representation format of the location information is modified to reduce the data size of the location information being transferred.

Also, the controller 180 can change the representation format of the obtained location information by setting the difference between coordinate values of a current location of the mobile terminal 100 expressed by the latitude and longitude and coordinate values of a predefined location expressed by the latitude and longitude as the location information. This example of discussed referring to FIG. 15.

Figure 15:
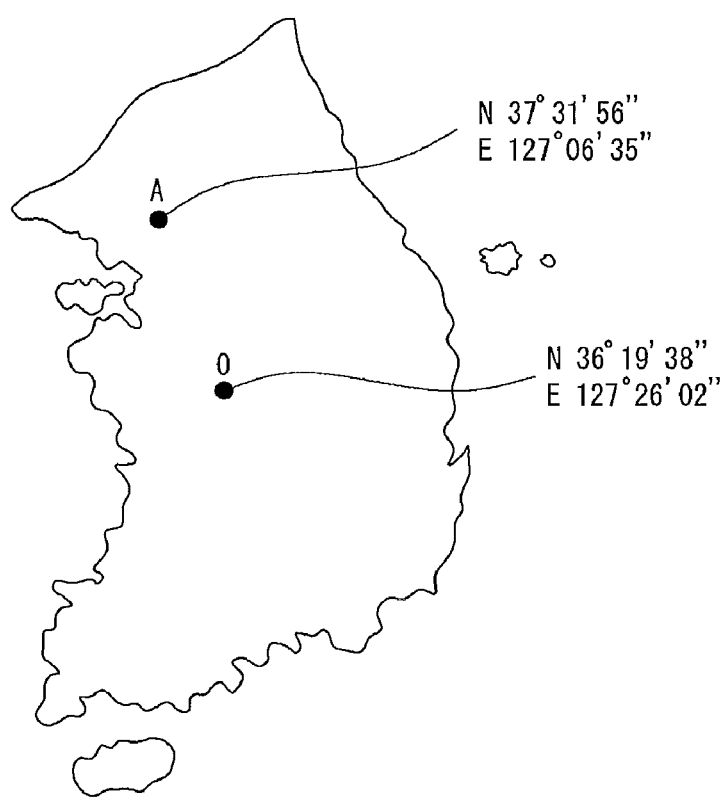
FIG. 15 illustrates an example of a latitude/longitude reference location set for South Korea according to the present invention.

FIG. 15 illustrates an example of a reference location for latitude and longitude defined in Korea.

With reference to FIG. 15, latitude and longitude coordinates about a current location ("A") of the mobile terminal 100 are (N 37° 31' 56", E 127° 06' 35") and latitude and longitude coordinates about a reference location ("O") are (N 36° 19' 38", E 127° 26' 02").

The controller 180 can set (N 1° 12' 18", E −40' 33") corresponding to the difference between these latitude and longitude coordinates of the current location ("A") and latitude and longitude coordinates of the reference location ("O") as location information to be transferred to the input receiver. The receiver mobile terminal (i.e., input receiver) stores latitude and longitude coordinates of the reference location. And the receiver, by receiving the difference as the location information and adding the received difference to the latitude and longitude coordinates of the reference location "O", can obtain the accurate location information of the current location "A".

Also, the controller 180 can change the representation format of the obtained location information by lowering precision of the coordinate values of latitude and longitude to a predefined level.

For example, let us suppose that the coordinate values of a current location of the mobile terminal 100 are (N 37° 30' 53.69", E 126° 59' 56.01"). The controller 180, by lowering the precision of the obtained coordinate values down to (N 37° 30', E 126° 59'), can reduce the data size of the obtained location information.

Other ways to reduce the data size of location information to be sent to receivers of the location information can be used.

Various methods of reducing the data size of location information described above can be used in a combined manner. For example, the controller 180 can set location information to be sent to a receiver (recipient of a message) as a difference between the coordinate values of a current location of the mobile terminal 100 and those of the reference location ("O") after lowering the precision of the coordinate values of the current location. Application order and types of employed methods for reducing the data size of the location information should be shared among mobile terminals that transfer and receive a message.

The controller 180 sends the input message and the changed location information to the input receiver, at step S340.

Fourth Embodiment-Use of Received Location Information at a Receiver Terminal

A method for receiving data of a mobile terminal and a mobile terminal for implementing the method according to a fourth embodiment of the present invention described later is related to a mobile terminal that enables a receiver terminal which received location information and a message together to use received location information in various ways and a method using the mobile terminal. In what follows, embodiments for various uses of location information received together with a message will be described in various ways.

Figure 16:
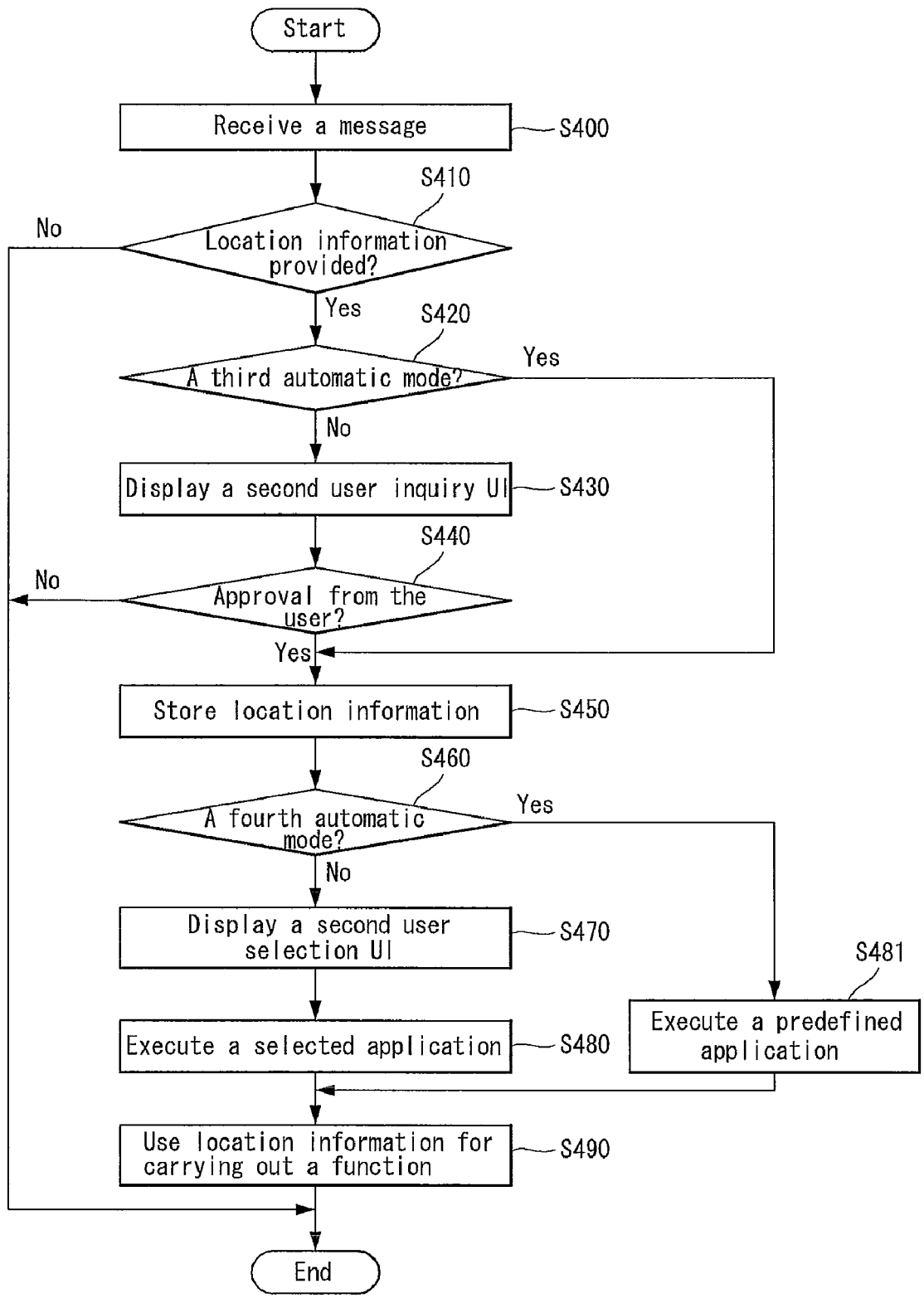
FIG. 16 illustrates a flow diagram of a method for receiving messages of a mobile terminal according to a fourth embodiment of the present invention.

FIG. 16 illustrates a method for receiving data of a mobile terminal according to a fourth embodiment of the present invention. The method for receiving data of a mobile terminal according to the fourth embodiment of the present invention can be implemented in a mobile terminal 100 described with reference to FIGS. 1 to 5C. In the following, with reference to FIG. 16 and related drawings, the method for receiving data of a mobile terminal according to the fourth embodiment of the present invention and operations of a mobile terminal 100 to implement the method are described in detail. The steps shown in FIG. 16 are performed on a receiver that receives a message, such as a recipient's terminal which may be a mobile terminal or non-mobile terminal.

Figure 17:
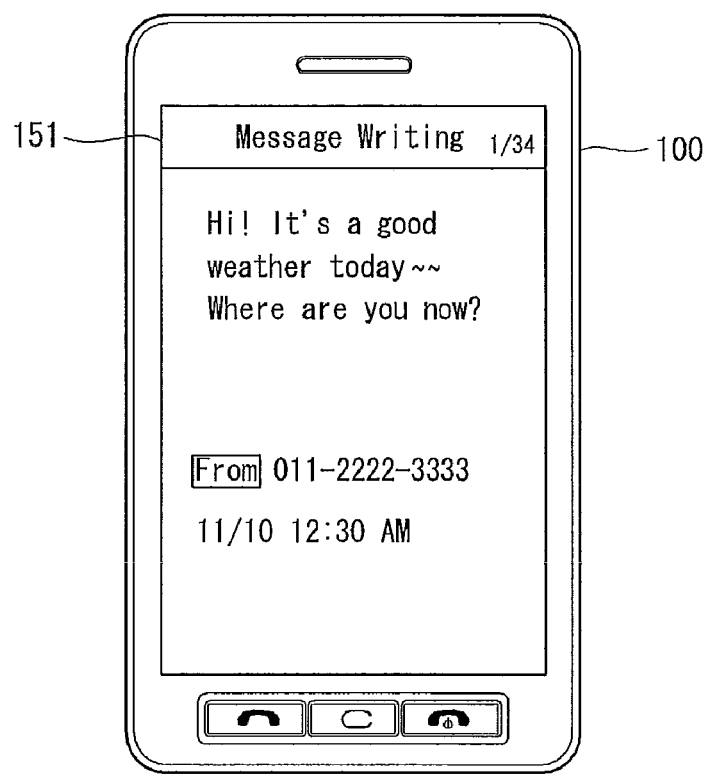
FIG. 17 illustrates an example of a received message according to the present invention.

Referring to FIG. 16, the controller 180 of a receiver such as a recipient's terminal 100 receives a message at step S400 and determines whether location information is provided with the received message at step S410. FIG. 17 illustrates an example of a message received by the recipient's terminal 100. The contents of the message received by the receiver as illustrated in FIG. 17 are assumed to be the same as those of the message sent from a sender illustrated in FIG. 7.

If location information (e.g., current location of sender's terminal, other location information, etc.) is provided with the received message, the location information can be provided with the message in various ways. As described above, the received message can include the location information as a separate file (file separate from a file containing the message) or as a text embedded in the message. Also, the location information can be tagged to a particular field of a data structure constituting the received message.

The controller 180, if it is found at the S410 step that the received message is provided with the location information, determines whether an automatic storage mode (hereinafter, it is referred to as a "third automatic mode") is set, the automatic storage mode managing whether to automatically carry out storing of the location information in the recipient's terminal 100 at step S420.

The controller 180, if the third automatic mode is not set, can display a user interface (hereinafter, it is referred to as a "second user inquiry UI") for inquiring whether to store the location information provided with the received message of the user at step S430 and determine the existence of an approval from the user through the second user inquiry UI at step S440.

Figure 18:
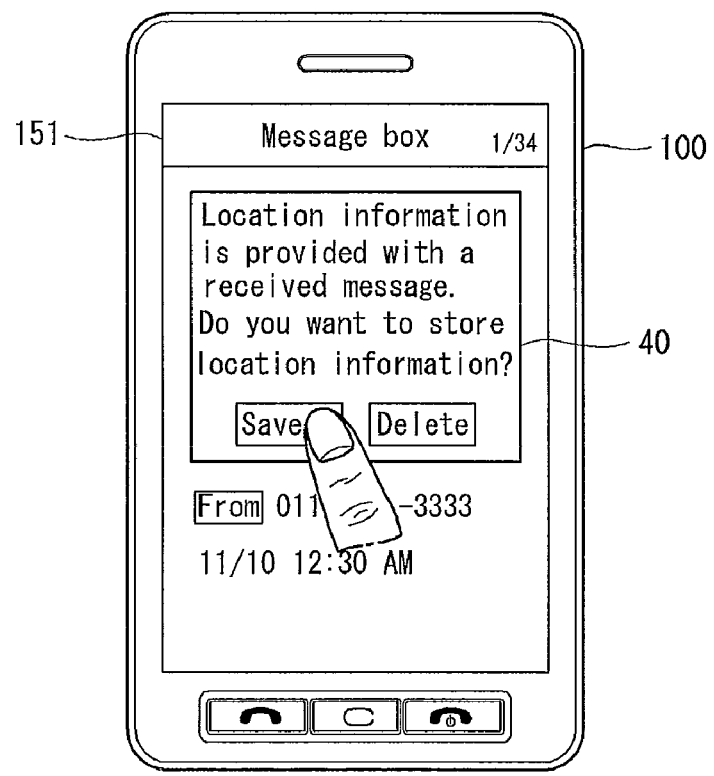
FIG. 18 illustrates an example of a screen displaying a second user inquiry UI 40 according to the present invention.

FIG. 18 illustrates an example of a screen displaying such a second user inquiry UI 40 on the recipients' terminal 100. Whether or not to display the second user inquiry UI 40 illustrated in FIG. 18 can be determined after the message is received and results of carrying out the steps of S410 and S420 are obtained. The second user inquiry UI 40 can include the contents inquiring the user of whether to store or delete the location information provided with the received message.

The controller 180, if the third automatic mode is set or an approval from the user is obtained through the second user inquiry UI 40, can store the location information provided with the received message in the memory 160 of the recipient's terminal 100, at step S450. The location information can be stored in the memory 160 temporarily or permanently.

The controller 180 determines whether the type of an application that uses the received location information is set previously (hereinafter, it is referred to as a "fourth automatic mode") at step S460.

The controller 180, if it is found at the S460 step that the type of an application that uses the received location information is not set previously, can display a user interface for receiving the user's selection of an application to use the received location information (hereinafter, it is referred to as a "second user selection UI") at step S470.

Figure 19:
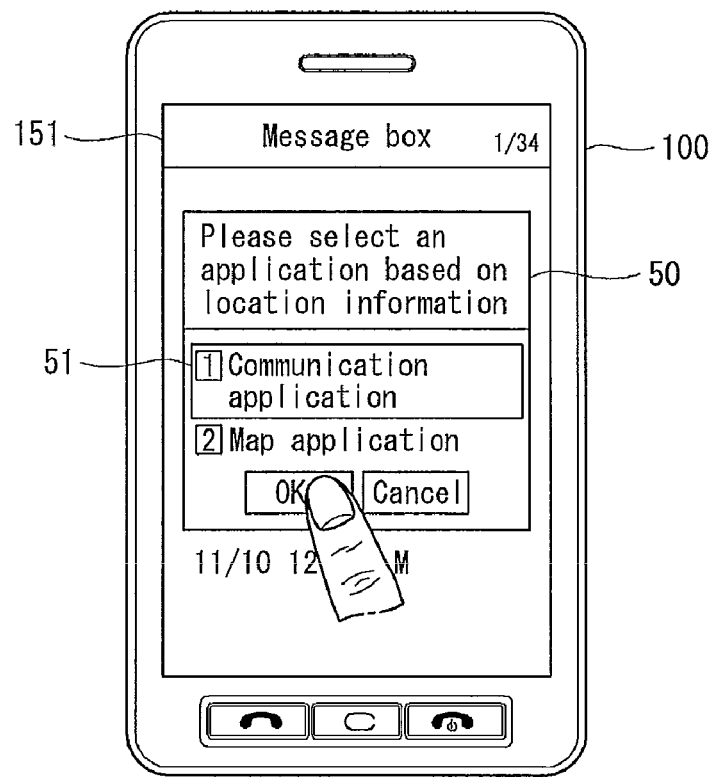
FIG. 19 illustrates an example of a screen displaying a second user inquiry UI 50 according to the present invention.

FIG. 19 illustrates an example of a screen displaying such a second user selection UI 50. The second user selection UI 50 can include the contents inquiring the user of the type of an application that will use the received location information. The reference number 51 of FIG. 19 is an indicator 51 for specifying a currently selected item.

The controller 180, according to the result of the S460 step, executes either an application selected through the second user selection UI 50 at step S480 or an application set previously at step S481. And at step S490 the controller 180 can utilize the stored location information for carrying out a function provided by a particular application executed at step S480 or S481. For instance, according to the setting of the recipient's terminal 100, when location information is received together with a message, the location information can be automatically stored in the terminal 100 and/or the location information can trigger an automatic executing/opening of a particular application for using the location information.

Various applications can use the stored location information. For example, the application can be a communication application for transferring the stored location information to an external electronic device. The communication application can be a message application. The user, by using the message application, can transfer the received location information to a third party.

On the other hand, the communication application can be a short range communication application for transferring the stored location information by using a short range communication method. The user can transfer the received location information to an external electronic device by using the short range communication application. For instance, the user in a taxi can transmit the location information (e.g., as a destination) to the taxi's terminal (e.g., installed on a dash board) using this feature.

Likewise, the application can be a map application that can display the stored location information on a map. For example, the controller 180, according to the result of the S460 step, can display the stored location information on a map if the selected application is a map application. This is discussed referring to FIG. 20.

Figure 20:
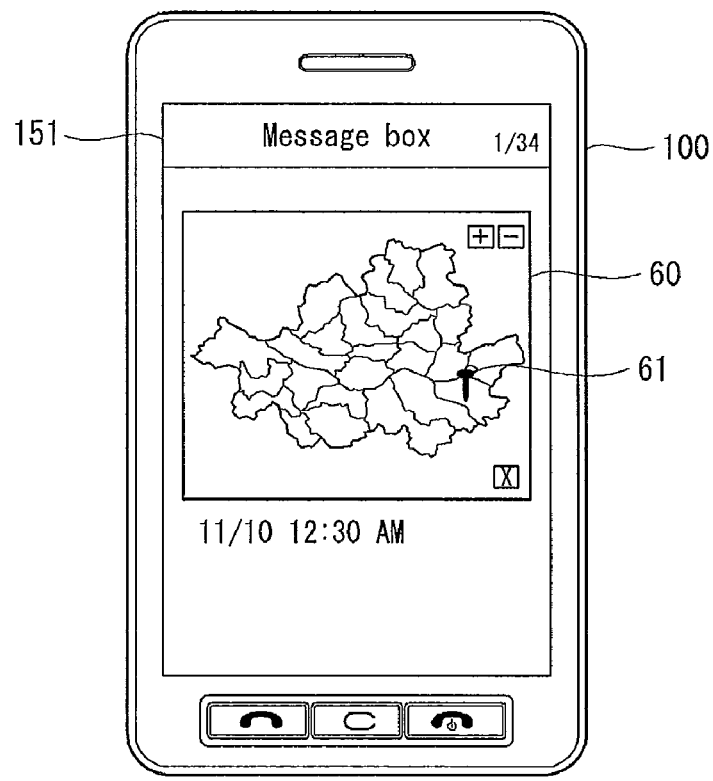
FIG. 20 illustrates an example where received location information is displayed on a map according to the present invention.

FIG. 20 illustrates an example of displaying received location information on a map. With reference to FIG. 20, the controller 180 can provide a pop-up window 60 that displays a map and displays a location 61 corresponding to the received location information on the map. In this way, the user at the receiver's side may recognize the location information easily.

Fifth Embodiment-Data Transfer by Using a Short Range Communication Method

Figure 21:
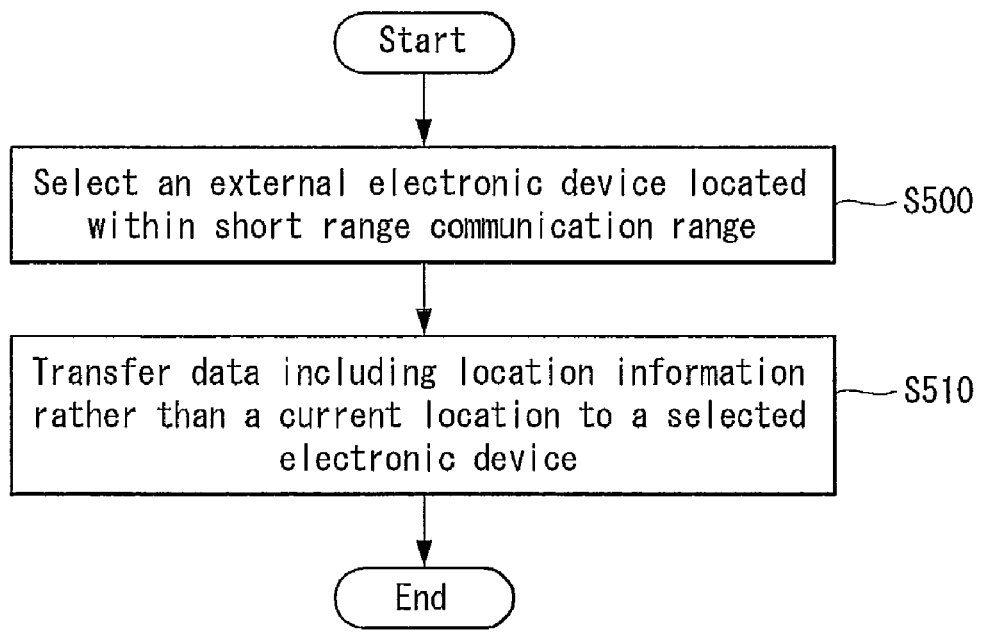
FIG. 21 illustrates a flow diagram of a method for transferring data of a mobile terminal according to a fifth embodiment of the present invention.
Figure 22:
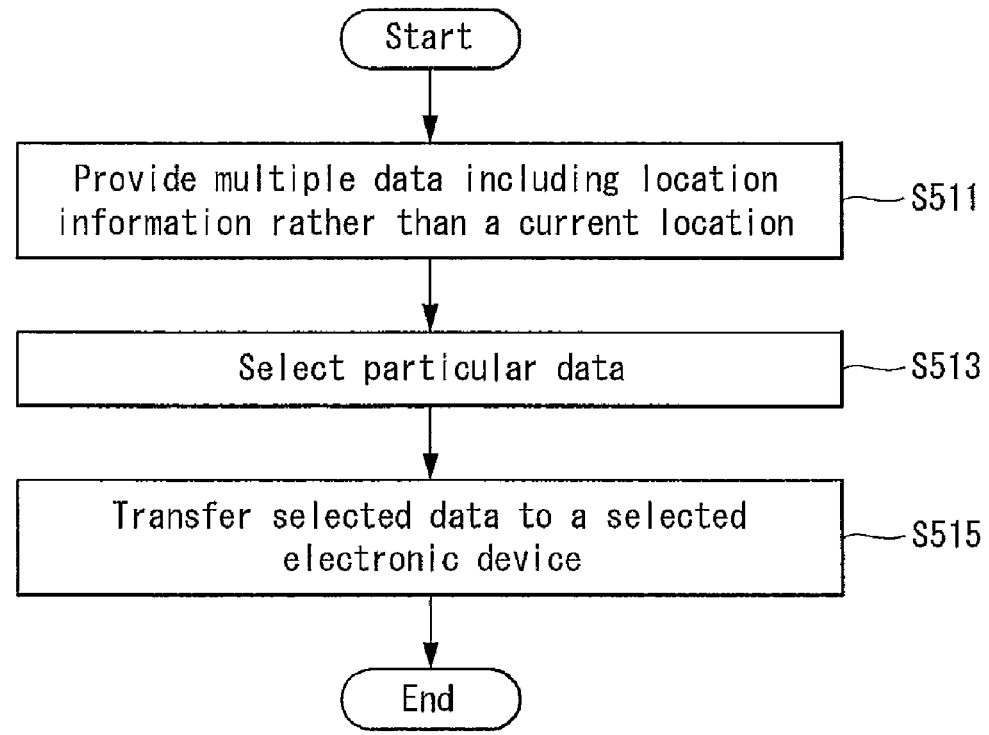
FIG. 22 illustrates a detailed flow diagram of S510 step of FIG. 21 according to the present invention.

FIG. 21 illustrates a flow diagram of a method for transferring data of a mobile terminal according to a fifth embodiment of the present invention. FIG. 22 is a detailed flow diagram of step S510 of FIG. 21. The method for transferring data of a mobile terminal according to the fifth embodiment of the present invention can be implemented in a mobile terminal 100 described with reference to FIGS. 1 to 5C. In the following, with reference to FIG. 21 and related drawings, the method for transferring data of a mobile terminal according to the fifth embodiment of the present invention and operations of a mobile terminal 100 to implement the method are described in detail. Here, the mobile terminal 100 can be a sender's terminal, receiver's terminal, external electronic device, etc.

Referring to FIG. 21, the controller 180 of the mobile terminal 100 receives a signal that selects a particular electronic device from among external electronic devices 300a, 300b, 300c, 300d located within a communication range 400 (e.g., see FIG. 5A) accommodated by the local area communication module 114, at step S500. The controller 180 can provide the user with a list of the electronic devices 300a, 300b, 300c, 300d located with the communication range 400. The user can select a particular electronic device from the provided list. The external electronic devices can be any type of electronic device.

Figure 23:
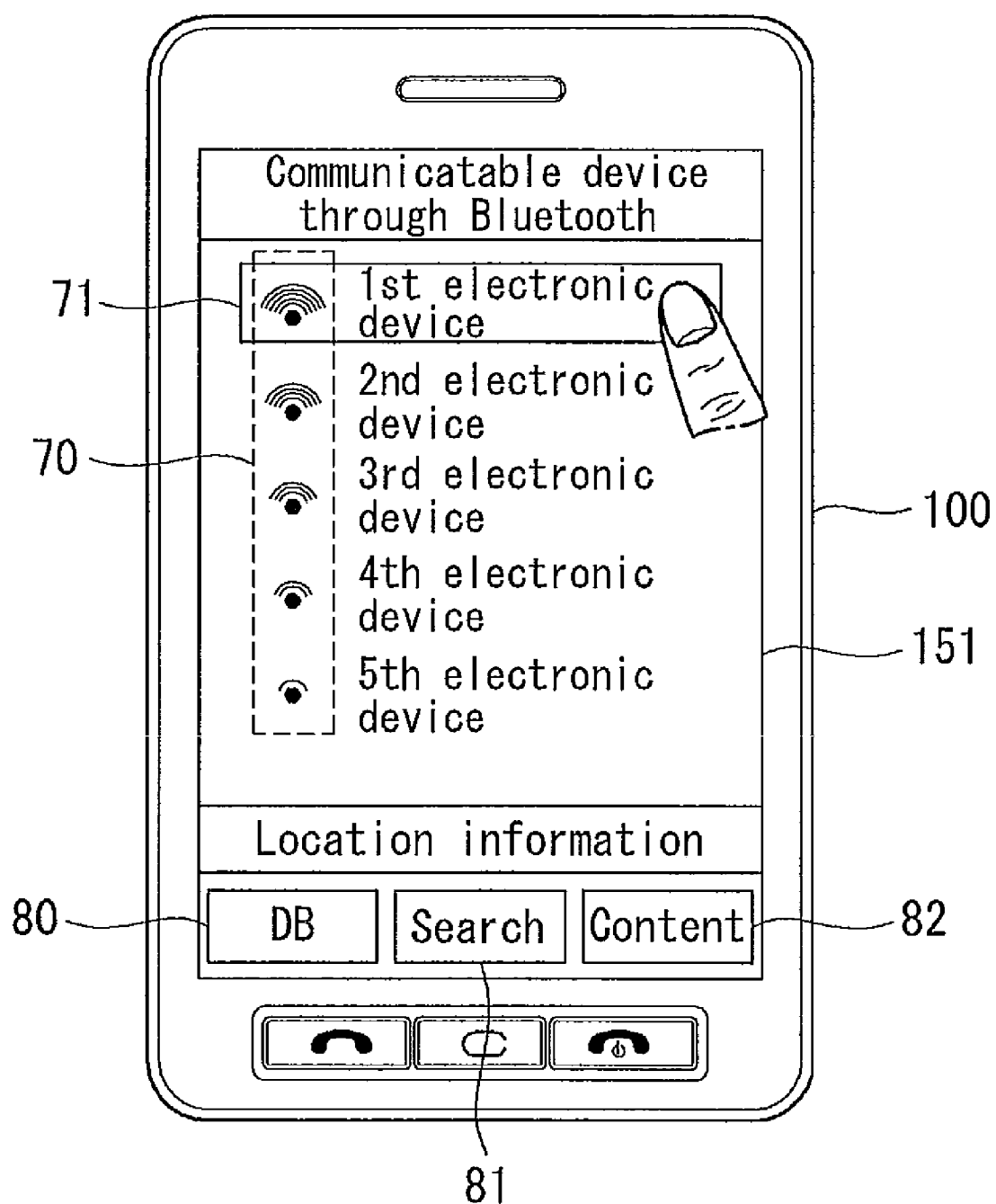
FIG. 23 illustrates an example of a situation where an external electronic device among multiple external electronic devices located within a communication range of short range communication is selected according to the present invention.

FIG. 23 illustrates a situation where the user selects an external electronic device located with communication range, e.g., at step S500. In the example of FIG. 23, five external electronic devices are shown to be located within the Bluetooth communication range, which is an example of a local area communication range. Also shown is a communication signal strength 70 for each external electronic device. The reference number 71 is a first indicator 71 for specifying a currently selected electronic device.

Meanwhile, with reference to FIG. 23, various functional icons 80, 81, 82 are provided in the area of <location information>. Functions corresponding to the respective functional icons are described later.

The controller 180 transfers data including location information to the selected electronic device by using a short range communication method (also referred to as a local area communication method) S510. Here, the location information preferably excludes a current location of the mobile terminal 100, but may include it if desired. Further, the location information that is transferred from the mobile terminal 100 to the selected external electronic device can be a plurality of different location information stored in the mobile terminal 100 or received by the mobile terminal 100.

The short range communication method can utilize Bluetooth, infrared data association (IrDA), Ultra Wideband (UWB), or ZigBee. It should be noted that the aforementioned short range communication methods follow the respective communication protocols.

With reference to FIG. 22, a detailed procedure of the S510 step is described.

The controller 180 can provide multiple data including location information preferably excluding a current location of the mobile terminal 100, at step S511. The controller 180 receives a signal that selects particular data from among the provided multiple data at step S513. The controller 180 can transfer the data selected from the S513 step to the selected external electronic device by using a short range communication method at step S515.

In the present embodiment, the location information being transferred from the mobile terminal 100 to the selected external electronic device can be obtained through various ways. For example, the location information can be received from an external electronic device. At this point, various communication methods can be used for communicating between an external electronic device that transfers the location information and the mobile terminal 100. In other words, the location information is not necessarily transferred and received through a short range communication method only. For example, the location information can be received either through the mobile communication module 112 or through the wireless Internet module 113. Also, the location information can be received in the form of data broadcasting through the broadcasting receiver module 111.

In addition, the location information can be received in the form of contents including location information from an external electronic device. The contents can be any one of a still image, video, text, and message. The location information can be contained in a particular field of a data structure of the contents.

Also, the location information can be obtained by the position information module 115 of the mobile terminal 100. At this point, the location information is not the one obtained at a current location where the mobile terminal 100 is located; rather, the location information is the one obtained previously by using the position information module 115 at a different location.

The location information, as described earlier, can be obtained in various ways such as Global Navigation Satellite System (GNSS), cell identification (cell-ID), and wireless LAN-based location sensing.

The location information can include latitude and longitude information. For example, first location information rather than a current location of the mobile terminal 100 can be latitude and longitude information such as "N 37° 29' 54", E 127° 01' 37".

Also, the location information can include a geographical name corresponding to the latitude and longitude. The controller 180 can obtain a geographical name corresponding to the latitude and longitude by using map data stored in the memory 160. For example, a geographical name corresponding to "N 37° 29' 54", E 127° 01' 37"" can be "Gangnam station". Therefore, the location information can include latitude and longitude information of "N 37° 29' 54", E 127° 01' 37"" and a geographical name of "Gangnam station" corresponding thereto.

The location information can be stored in the memory 160. The memory 160 can store a location information database including a plurality of different location information. The location information database can be managed by a separate management application. In the S511 step, the plurality of data can be provided through a graphic user interface (GUI) corresponding to the management application.

For example, in the S511 step, the controller 180 can provide the location information database for the user through the GUI. At this point, the controller 180, if the location information corresponding to a current location of the mobile terminal 100 exists in the location information database, can provide remaining location information, excluding the location information corresponding to the current location of the mobile terminal 100.

Figure 24:
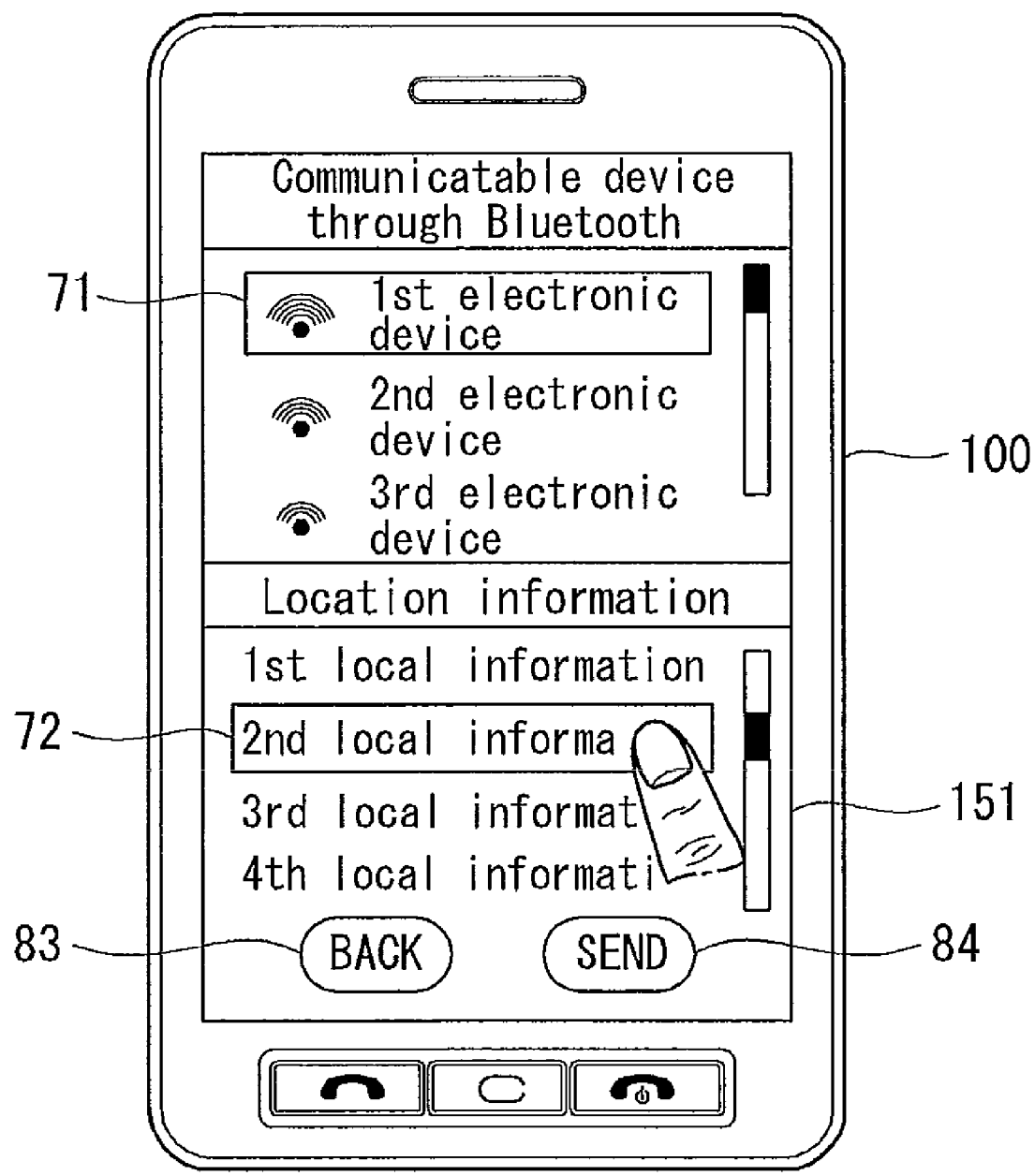
FIG. 24 illustrates an example where a location information database is provided through a GUI according to the present invention.

FIG. 24 illustrates an example where a location information database is provided through a GUI on a screen of the mobile terminal 100. The screen shown in FIG. 24 can be displayed when an icon <DB> 80 of FIG. 22 is selected. For instance, the icon <DB> 80 is the one intended for providing a function to display location information stored in the memory 160 on the display unit 151.

In a <location information> area of FIG. 24, a plurality of different location information is displayed. The plurality of location information displayed in a <location information> area, as described above, can correspond to various location information about a location, which preferably excludes a current location of the mobile terminal 100. The reference number 72 is a second indicator 72 for specifying currently selected location information.

If the user selects an icon <BACK> 83 of FIG. 24, a screen shown in FIG. 23 can be recovered and displayed. And if the user selects an icon <SEND> 84, the controller 180 transfers currently selected second location information as indicated by the indicator 72 to a currently selected first electronic device as indicated by the indicator 71 through Bluetooth communication or other local area communication techniques.

Also, the controller 180 can provide a search tool for searching the location information database for particular location information. The user can search the location information database for particular location information by using the search tool. This is discussed in more detail referring to FIG. 25.

Figure 25:
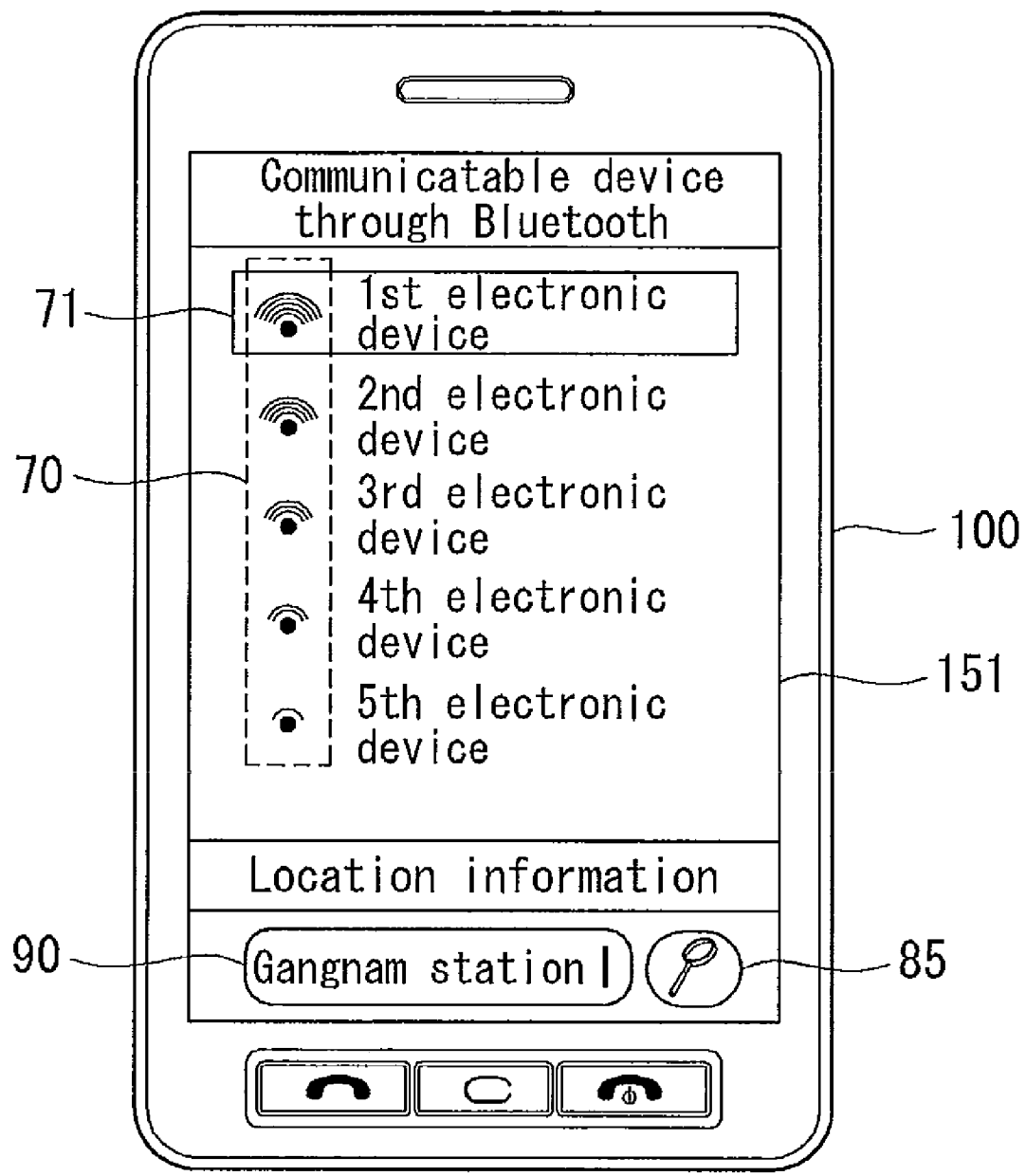
FIG. 25 illustrates an example of a screen where a search tool to search for location information is provided according to the present invention.

FIG. 25 illustrates an example of a screen where a search tool to search for location information is provided on the screen of the mobile terminal 100. The screen of FIG. 25 can be displayed when an icon <SEARCH> 81 of FIG. 23 is selected. For instance, the icon <SEARCH> 81 is the one intended for providing a search tool to search for location information stored in the memory 160.

The controller 180, as shown in FIG. 25, can provide a search window 90 for searching for location information desired by the user. The user can search for location information corresponding to the input location information (or location information including the input location information) by inputting the user's desired location information through the search window 90 and selecting a search button 85. A resulting screen after the search can be similar to that of FIG. 24.

In the S511 step, the controller 180 can provide the user with a list of contents including location information excluding a current location of the mobile terminal 100.

Figure 26:
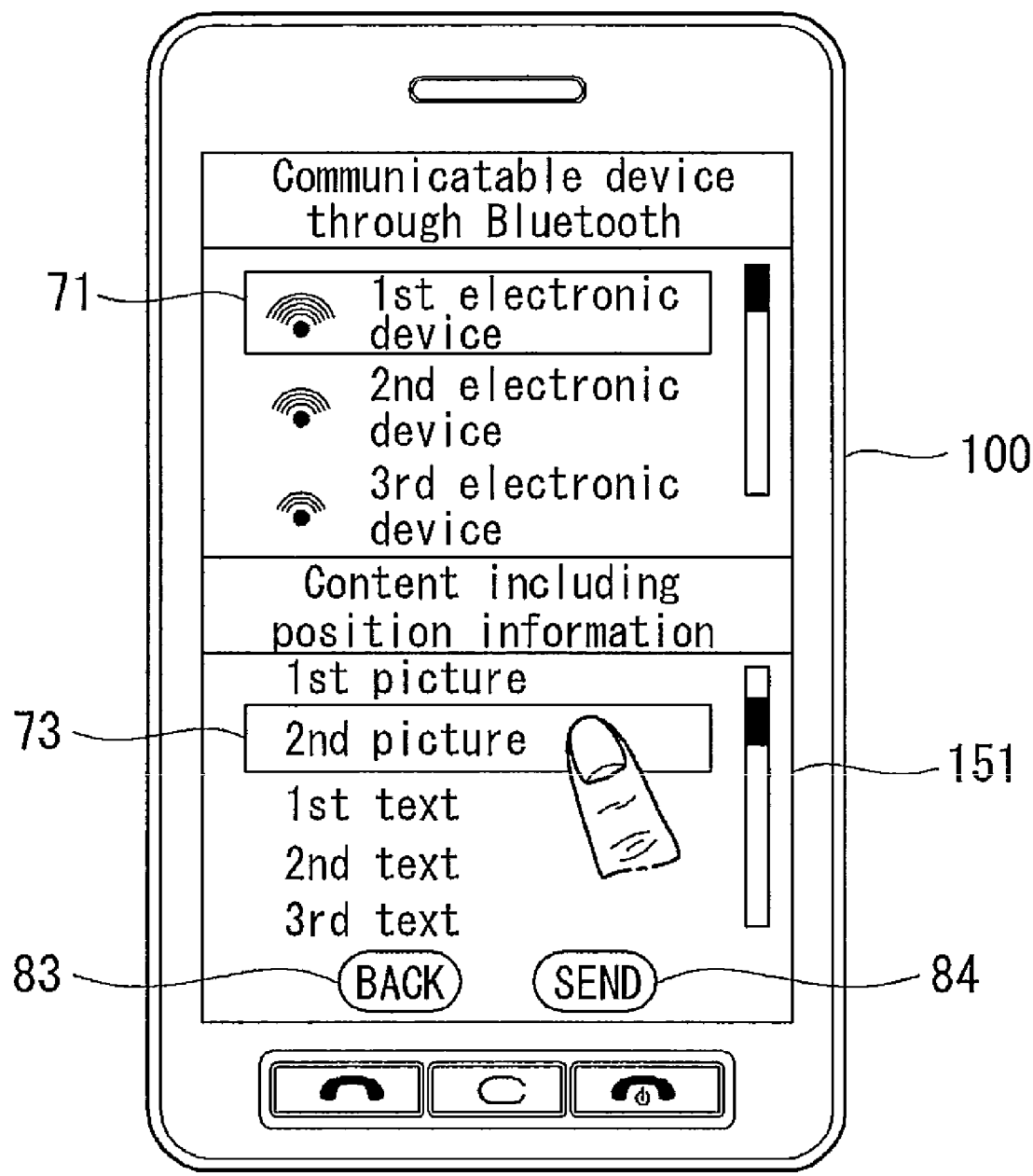
FIG. 26 illustrates an example of a screen where a list of contents including location information is provided.

FIG. 26 illustrates an example of a screen where a list of contents including location information is provided. The screen of FIG. 26 can be displayed when an icon <CONTENTS> 82 of FIG. 23 is selected. For instance, the icon <CONTENTS> 82 is the one intended for providing a function to display a list of contents (which are stored in the memory 160) including location information on the display unit 151.

In a <location information> area of FIG. 26, a plurality of different location contents are displayed. The plurality of contents displayed in the <location information> area, as described above, can include location information about a location, which is not a current location of the mobile terminal 100. The reference number 73 is a third indicator 73 for specifying currently selected contents.

If the user selects an icon <BACK> 83 of FIG. 26, the screen shown in FIG. 23 can be recovered and displayed. And if the user selects an icon <SEND> 84 in FIG. 26, the controller 180 transfers a currently selected second photo as indicated by the indicator 73 to a currently selected first electronic device as indicated by the indicator by the indicator 71 through Bluetooth communication or other local area communication techniques. The second photo, as described above, includes location information of a location other than a current location of the mobile terminal 100.

Meanwhile, the controller 180 can transfer only the location information included in the selected contents from a list of contents including location information to the selected first electronic device. For example, if the user selects an icon <SEND> 84 of FIG. 26, the controller 180 can transfer only the location information included in the currently selected second photo to the currently selected first electronic device through the Bluetooth communication.

Figure 27:
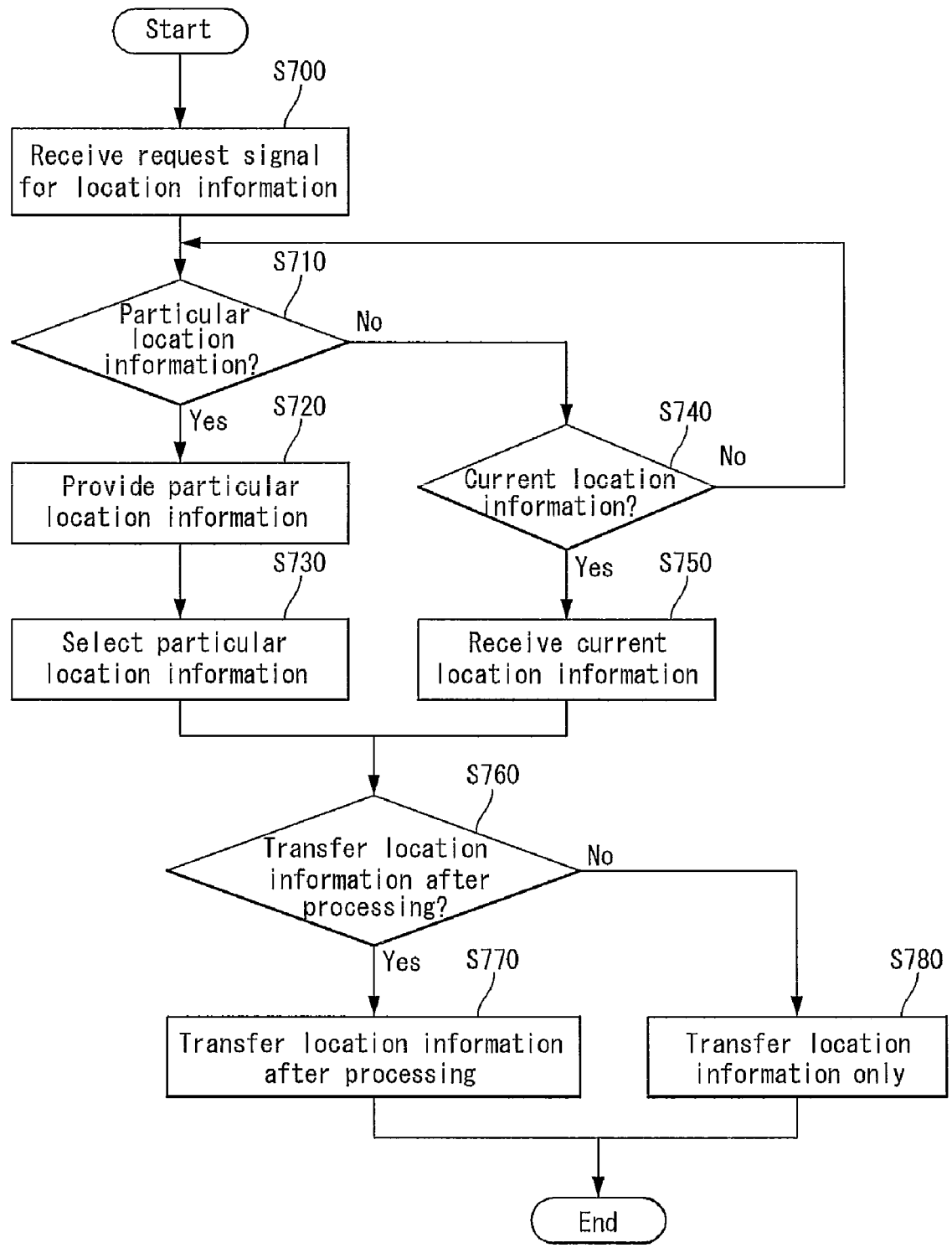
FIG. 27 is a flowchart illustrating a method of providing location information of a mobile terminal according to an embodiment of the present invention.

FIG. 27 illustrates a flow diagram of a method for transmitting data of a mobile terminal according to the sixth embodiment of the present invention. FIGS. 28 to 32 illustrate examples of a screen where the method for transmitting data of a mobile terminal is implemented according to the sixth embodiment of the present invention. In the examples of FIGS. 28-32, the location information is organized and displayed based on certain criteria on the display unit of the mobile terminal.

The method for transmitting data of a mobile terminal according to the sixth embodiment of the present invention can be implemented in a mobile terminal 100 described with reference to FIGS. 1 to 5C. In what follows, with reference to FIG. 27 and related drawings, the method for transmitting data of a mobile terminal according to the sixth embodiment of the present invention and operations of a mobile terminal 100 to implement the method are described in detail.

The controller 180 of the mobile terminal 100 receives a location information request signal from the outside at step S700. The location information request signal can be received from an outside location providing server or other entity through the radio communication unit 110 of the mobile terminal 100. Also, the location information request signal can be received from an outside separate terminal ) together with a message through the radio communication unit 110. The message referred to in the present embodiment or document may include short message service (SMS), multimedia messaging service (MMS), and e-mail. If the message is SMS or MMS, the message can be received through the mobile communication module 112. On the other hand, if the message corresponds to an e-mail, the message can be received through the wireless Internet module 113.

Meanwhile, the S700 step can be omitted. In other words, the methods for transmitting data according to the present invention can be carried out without receiving a location information request signal from the outside. For example, without receiving a location information request signal from the outside, the user can send location information according to the present invention to the outside at the user's own choice.

The controller 180 determines whether or not location information requested by the location information request signal or location information to be transferred by the user is about a particular location other than a current location of the mobile terminal 100 at step S710. This determination step can be carried out in various ways. For example, if the location information request signal is included in a received message, it is determined based on whether a predefined keyword is included in the message and/or a sender that transferred the received message is registered in a phonebook stored in the memory.

If it is found at the step 710 that the location information requested by the location information request signal or location information to be transferred by the user is about the current location, the location information about the current location of the mobile terminal 100 is obtained or received so that it can be transferred/transmitted out at step S750. The controller 180 can obtain the location information, e.g., current location of the mobile terminal 100, by controlling the position information module 115. The location information, as described earlier, can be obtained in various ways such as Global Navigation Satellite System (GNSS), cell identification (cell-ID), and wireless LAN-based location sensing technique.

Figure 28:
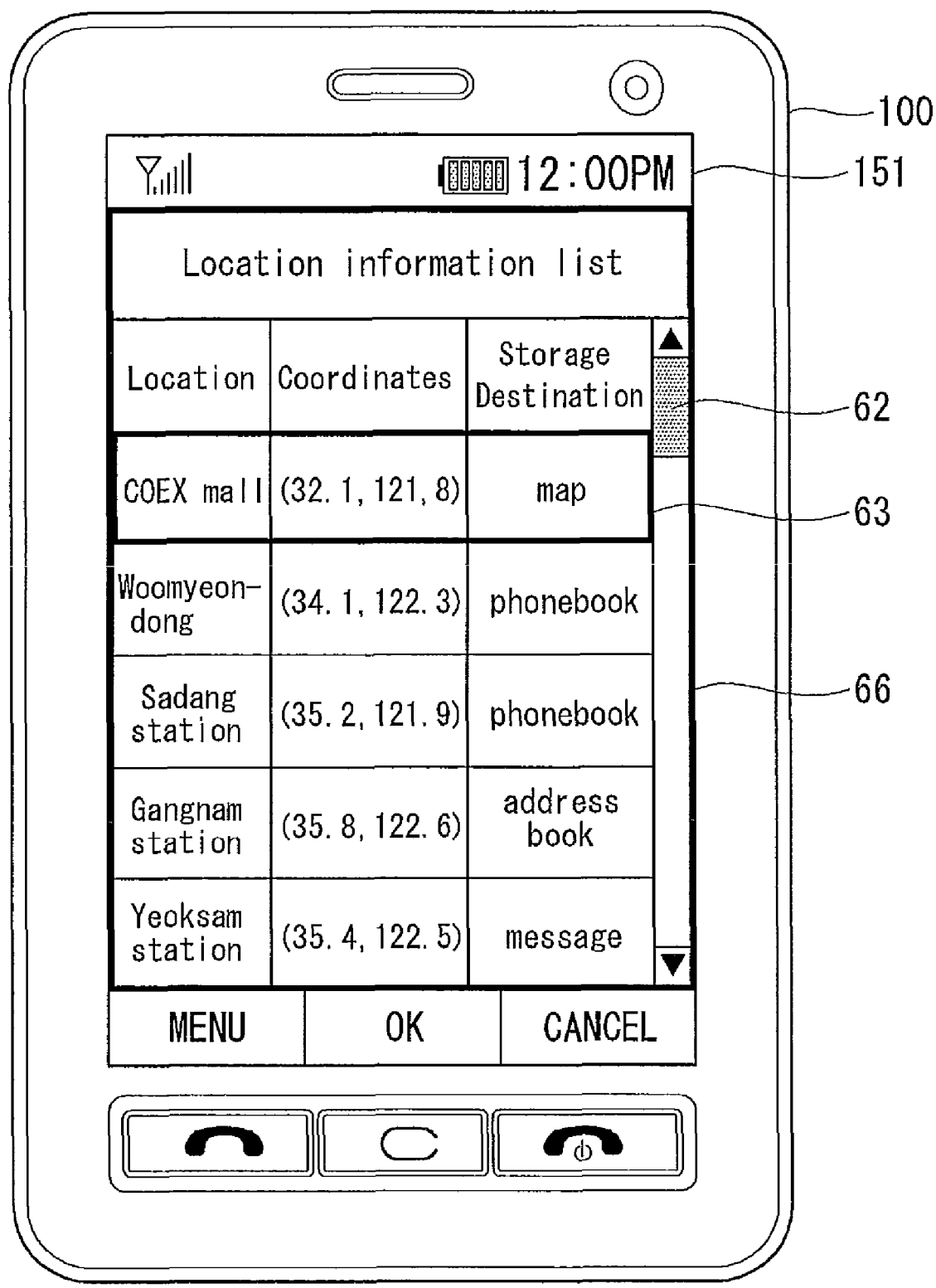
FIGS. 28 to 32 are diagrams showing examples of a screen where the method of providing location information of a mobile terminal is implemented according to one embodiment of the present invention.

The location information can be received or obtained in various ways. For example, the current location information (e.g., current location of the mobile terminal 100) can include latitude and longitude information. Also, the current location information can include a geographical name corresponding to the latitude and longitude. For example, as shown in FIG. 28, the location information can include (32.1, 121.8) which is latitude and longitude value. At this point, (32.1, 121.8) can represent 32.1 degrees of north and 121.8 degrees of east. Also, a geographical name corresponding to the latitude and longitude value of (32.1, 121.8) can be received together. For example, a geographical name COEX mall corresponding to the latitude and longitude value of (32.1, 121.8) can be received together.

Meanwhile, if it is found at the S710 step that location information requested by the location information request signal or location information to be transferred by the user is about a particular location and/or an arbitrary location other than the current location, the controller 180 can provide the display unit 151 with a plurality of location information (other than the current location information of the mobile terminal 100) stored in the memory 160 of the mobile terminal 100, at step S720. A method for providing this plurality of location information can be carried out in various ways and discussed referring to FIG. 28.

FIG. 28 illustrates an example of a screen provided by a graphical user interface (GUI) corresponding to an application for managing location information stored in a mobile terminal 100.

With reference to FIG. 28, a plurality of location information can be displayed on a graphic user interface corresponding to an application for managing all the location information stored in the memory 160 of the mobile terminal 100 (e.g., location information list screen 66) irrespective of a storage destination. The location information list screen 66 can display on the display unit 151 an indicator 63 designating particular location information from among a plurality of location information.

The indicator 63 can be moved among a plurality of location information by a command signal received from the user through the user input unit 130. For example, the user, by manipulating arrow keys equipped in a keypad or using a touch screen, can move the indicator 63 among a plurality of location information. Also, one location information among a plurality of location information can be selected by selecting location information where the indicator 63 is currently located.

If the controller 180 cannot display all of location information displayed on the location information list screen 66 within the full screen, a scroll bar 62 can be provided for the display unit 151. The user, by manipulating the scroll bar 62, can scroll up and down the screen.

Also, the location information list screen 66 can display a storage destination where the corresponding location information is stored. That is, the storage destination indicates a particular storage unit in which the corresponding location information is stored within the mobile terminal 100. For example, not only a geographical information, COEX mall and latitude and longitude coordinate values of (32.1, 121.8) of the corresponding particular location information but also a map which is a storage destination of the corresponding location information can be displayed together.

Meanwhile, the controller 180, by sequentially ordering (listing in certain order) a plurality of location information stored in the memory 160 of the mobile terminal 100 in terms of the number of transfers to other terminals, can arrange a plurality of location information in the order/sequence of transfer frequency on the location information list screen 66, thereby providing a plurality of location information about a particular location. This is shown in FIG. 29.

Figure 29:
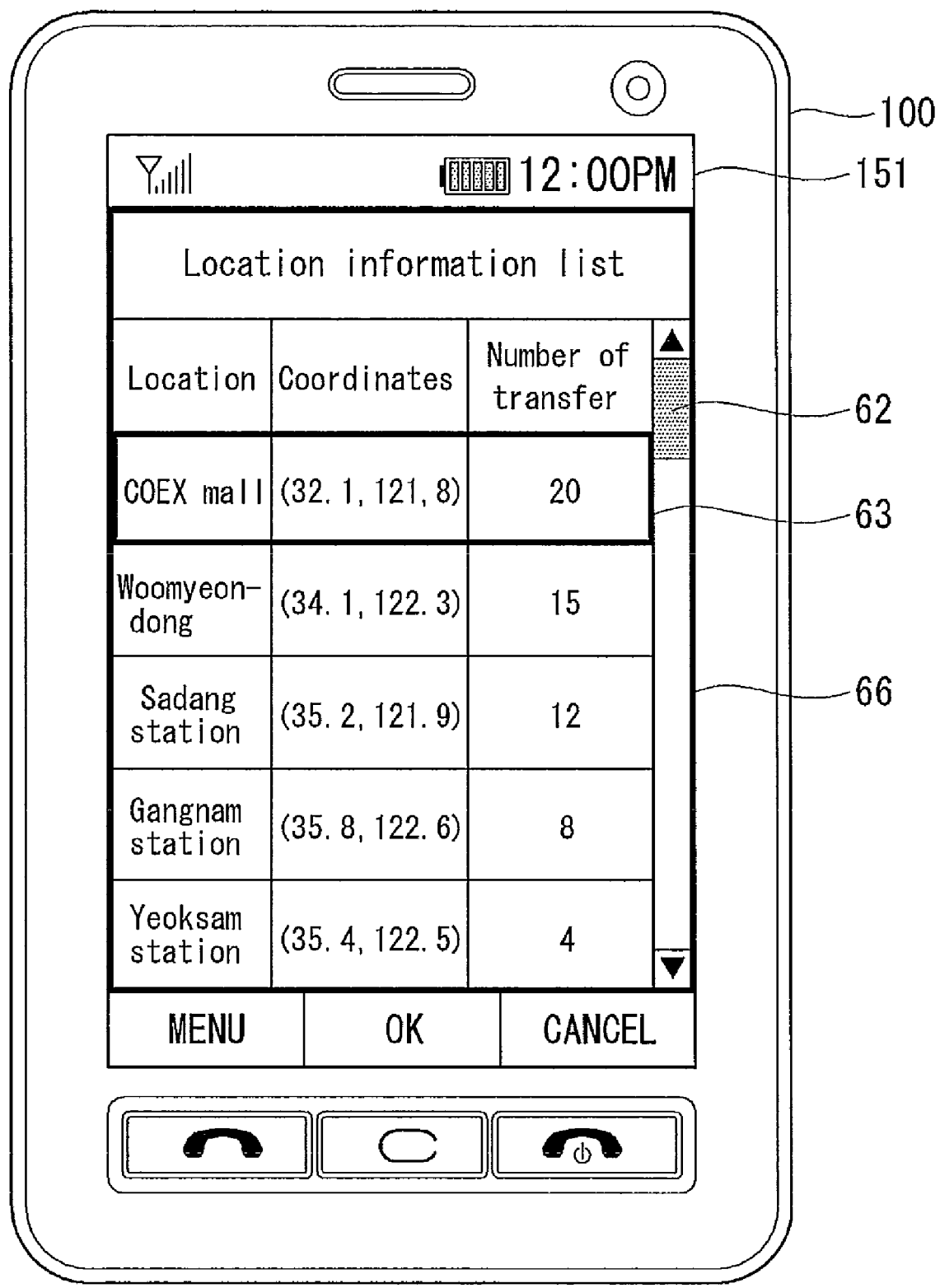

As shown in an example of FIG. 29, the location information list screen 66 can display the number of transfers for each location information. For example, not only a geographical information, COEX mall and latitude and longitude coordinate values of (32.1, 121.8) of the corresponding particular location information but also the number of transfers of the corresponding location information (e.g., "20") can be displayed together. Here, "20" may mean that this location information has been transmitted to another device from the current mobile terminal 100 for twenty times. Accordingly, the user can easily identify the location information which is transferred frequently and therefore, can easily search location information of high transfer frequency.

Figure 30:
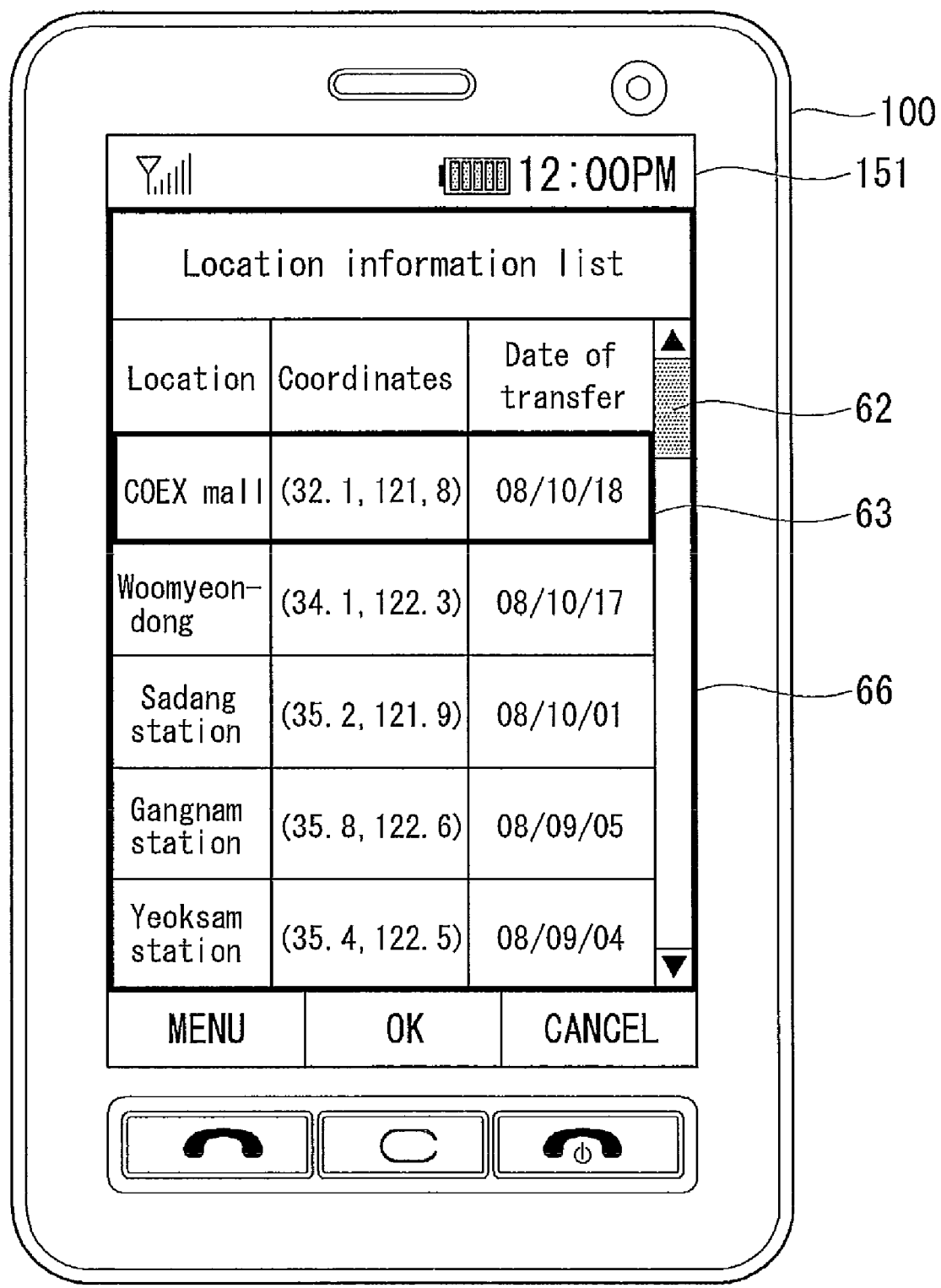

Also, the controller 180, by ordering or organizing a plurality of location information stored in the memory 160 of the mobile terminal 100 in terms of the date transferred to other terminals, arranges a plurality of location information in the order of transfer date on the location information list screen 66, thereby providing a plurality of location information about a particular location. As shown in FIG. 30, the location information list screen 66 can display the transfer date of the corresponding location information For example, not only a geographical information, COEX mall and latitude and longitude coordinate values of (32.1, 121.8) of the corresponding particular location information but also the transfer date of the corresponding location information "08/10/18" can be displayed together. At this point, "08/10/18" represents the date when the corresponding location information has recently been transferred (e.g., last transfer date). Accordingly, the user can easily search for the location information recently transferred and location information transferred at a particular date.

Figure 31:
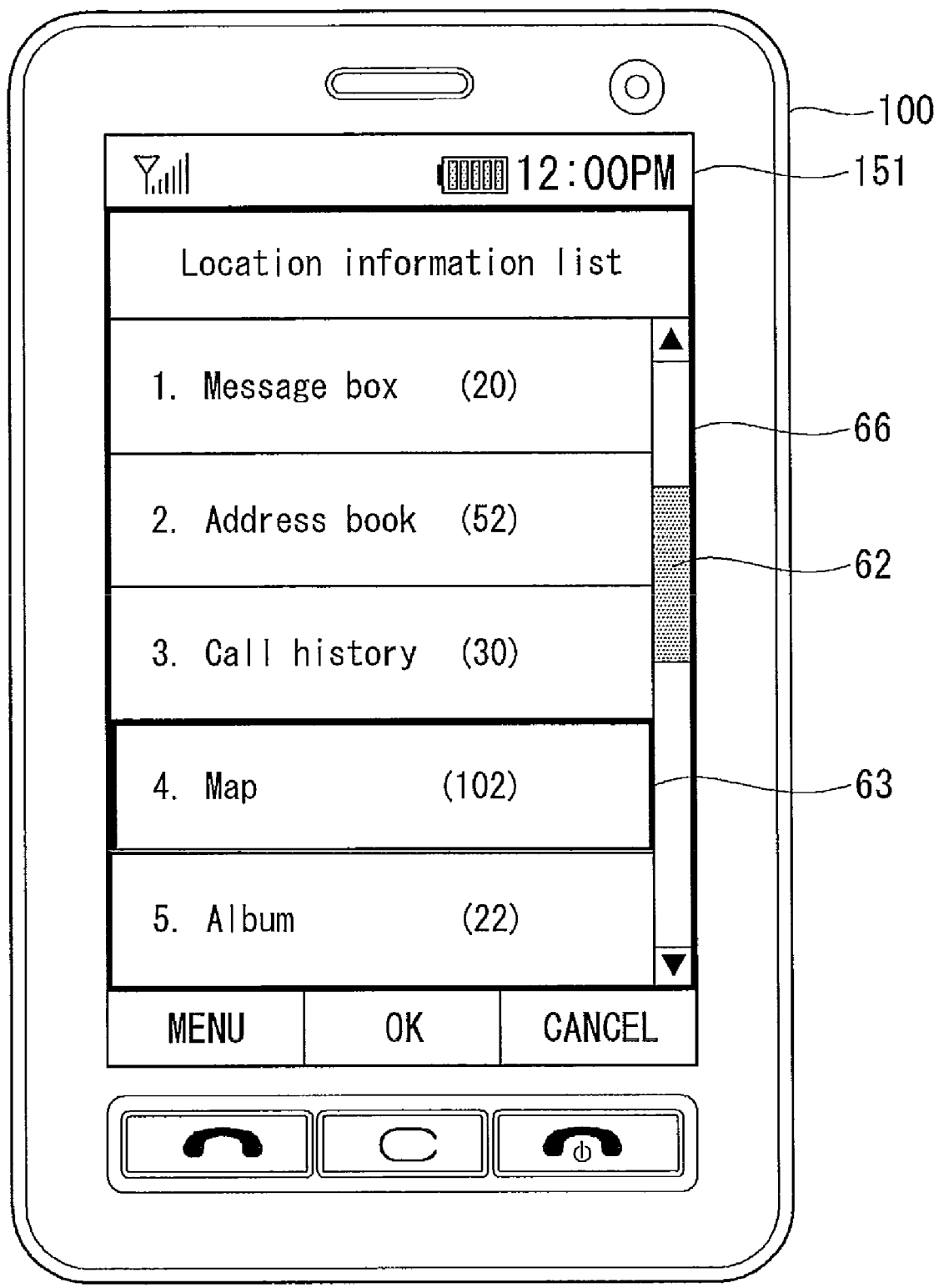
Figure 32:
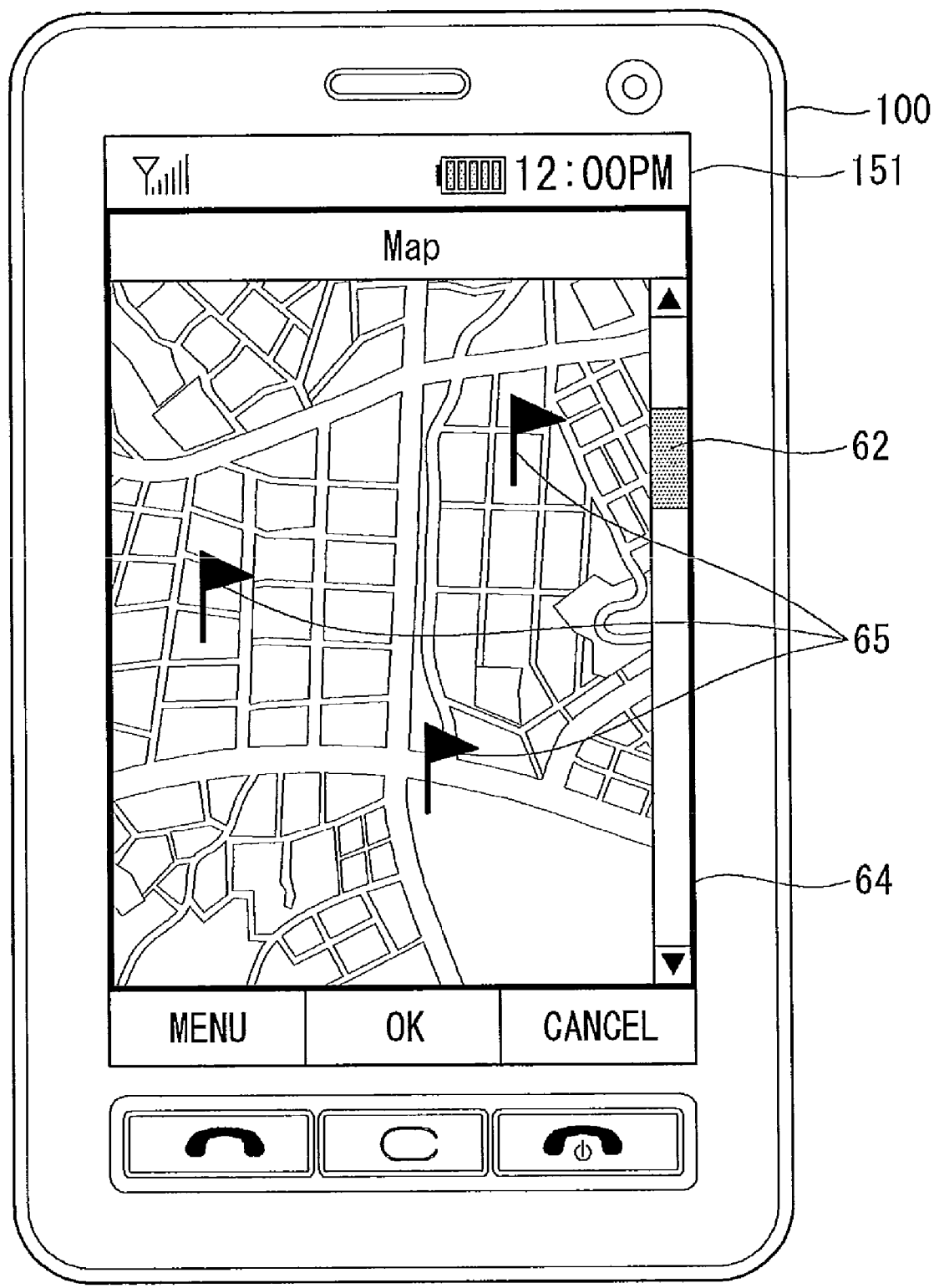

Also, the controller 180 can organize a plurality of location information stored in the memory 160 of the mobile terminal 100 in terms of storage destination and thus provide the arranged location information for the respective applications including location information stored in the mobile terminal 100. As shown in FIG. 31, the location information list screen 66 displays storage destinations where a plurality of location information is stored, the storage destinations being classified according to categories.

Also, the number of location information stored according to categories can be displayed together. For example, by doing so, among a plurality of location information, the user can easily recognize the following in the example of FIG. 31: 1. the number of location information stored in a message box is 20; 2. the number of location information stored in an address book is 52; 3. the number of location information stored in a call history is 30; 4. the number of location information stored in a map is 102; and 5. the number of location information stored in an album is 22.

Also, the location information list screen 66 can display storage destinations where a plurality of location information is stored, which are classified not only by the categories but also by hierarchical structure. Therefore, the user can easily search for a plurality of location information stored according to applications including location information.

Also, the controller 180 can store a plurality of location information stored in the memory 160 of the mobile terminal 100 by matching the plurality of location information with particular positions of a map 64 provided by the mobile terminal 100 and display particular positions of the map 64 with which the location information is matched as particular symbols 65. For instance, the symbols 65 indicate locations corresponding to various location information stored in the map database. Subsequently, if the user selects a particular symbol 65 from the map 64 on the display unit 151, location information corresponding to the selected particular symbol 65 can be provided for transfer.

Returning to FIG. 27, as described in FIGS. 28 to 32, the controller 180, from among a plurality of location information provided in various ways, selects location information about a particular location desired by the user through the user input unit 130, at S730.

The controller 180 determines whether to transfer the location information about the particular location selected at the S730 step and/or location information about the current location received at the S750 step, after processing the location information at step S760. If the location information is transferred after the processing thereof based on the determination result of the S760 step, the location information is transferred to other terminal(s) or external electronic device(s) and may be included in any one of still images, video, text, and map data at step S770.

Meanwhile, if the location information only is transferred after carrying out the S760 step, only the location information is transferred to other terminal(s) at step S780.

Transfer at the steps of S770 and S780 can be carried out in various ways. The location information can be transferred together with a message, that is, SMS or MMS through the mobile communication module 112. Also, the location information can be transferred along with an e-mail through the wireless Internet module 113.

In addition, from among a plurality of location information illustrated in FIG. 29 or 30, location information of the highest transfer frequency or location information transferred most recently can be immediately transferred by inputting specific keys of the mobile terminal 100.

Also, the selected location information can be transferred by a short range communication method through the local area communication module 114 of the mobile terminal 100.

Methods for transferring and receiving data of a mobile terminal according to the embodiments of the present invention described above can be provided or implemented as being recorded in a computer-readable storage medium as a program to be executed in a computer.

Methods for transferring and receiving data of a mobile terminal according to the embodiments of the present invention can be executed by software. When executed by software, constituting means of the present invention correspond to code segments carrying out necessary tasks. Programs or code segments can be stored in a processor-readable medium or transferred by a transfer medium or computer data signals combined with carrier waves through a communication network.

A computer-readable storage medium can include all kinds of recording apparatus to which data that can be read by a computer system are stored. Examples of computer-readable recording apparatus are ROM, RAM, CD-ROM, DVD±ROM, DVD-RAM, magnetic tape, floppy disk, hard disk, and optical data storage. Also, a computer-readable storage medium can be distributed across computer apparatus connected to a network and computer-readable codes can be stored and executed in a distributed manner.

The mobile terminal and the methods of transferring or receiving data using the same according to some embodiments of the present invention have the following advantages.

According to the present invention, messages, together with location information, are transmitted or received in various ways. Accordingly, there are advantages in that efficiency in transferring or receiving location information can be improved and received location information can be used in association with various applications.

Further, according to the present invention, location information can be transmitted or received between terminals using a short-range communication method. Accordingly, there is an advantage in that location information can be used in various ways.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A mobile terminal for processing a message, comprising:
   a communication unit;
   a location information unit configured to manage at least one location information; and
   a controller configured to obtain a specific location information and to transfer together a first file including the message and a second file including the selected specific location information through the communication unit, the first file being different from the second file.

2. The mobile terminal of claim 1, wherein the selected specific location information includes latitude and longitude information recorded in at least one predefined field within the second file.

3. The mobile terminal of claim 1, wherein the location information unit is further configured to obtain the location information by using at least one of the following:
   a satellite system including at least one from among GPS, GALILEO, GLONASS, COMPASS, and QZSS;
   communication with at least one base station included in a wireless communication system; and
   communication with at least one access point included in a wireless LAN system.

4. The mobile terminal of claim 1, wherein the capacity of text that the message can include is restricted.

5. The mobile terminal of claim 1, wherein the controller is configured to generate the second file to include the specific location information in the form of a text.

6. The mobile terminal of claim 1, wherein the specific location information includes a geographical name.

7. The mobile terminal of claim 1, wherein the controller is further configured to receive information on a recipient of the first and second files from a user.

8. The mobile terminal of claim 1, wherein the recipient of the first and second files is identified by at least one of an address, a phone number and a URL.

9. The mobile terminal of claim 7, wherein the recipient of the first and second files is identified by at least one of an address, a phone number and a URL.

10. The mobile terminal of claim 1, wherein the controller is further configured to provide a user interface related to at least one operation of the operation of obtaining the specific location information and the operation of transferring the first and second files.

11. The mobile terminal of claim 10, wherein the controller is further configured to provide the user interface related to selecting whether to transfer the first and second files separately.

12. The mobile terminal of claim 10, wherein the controller is further configured to provide the user interface for receiving a selection signal for selecting the specific location information from a user.

13. The mobile terminal of claim 12, wherein the controller is configured to provide a graphical user interface as the user interface, wherein the graphical user interface is provided only for receiving the selection signal for selecting the specific location information.

14. The mobile terminal of claim 12, wherein the specific location information is location information about a current location of the mobile terminal or location information about other location except the current location.

15. The mobile terminal of claim 10, wherein the controller is configured to provide the user interface through a screen for inputting the message.

16. The mobile terminal of claim 11, wherein the controller is configured to provide the user interface through a screen for inputting the message.

17. The mobile terminal of claim 12, wherein the controller is configured to provide the user interface through a screen for inputting the message.

18. The mobile terminal of claim 1, wherein the controller is configured to automatically or manually determine whether to transfer the first and second files separately according to a preset mode for location information transfer.

19. The mobile terminal of claim 1, wherein the controller is configured to automatically obtain the specific location information about a current location of the mobile terminal.

20. The mobile terminal of claim 2, wherein the controller is configured to automatically obtain the specific location information about a current location of the mobile terminal.

21. The mobile terminal of claim 1, further comprising:
a memory configured to store the at least one location information,
wherein the controller is configured to obtain the specific location information selected among the at least one location information stored in the memory.

22. The mobile terminal of claim 1, wherein the specific location information can be selected by a user before entering a screen for inputting the message.

23. The mobile terminal of claim 1, wherein the specific location information and the message are identified separately from each other by a recipient of the first and second files.

* * * * *